United States Patent [19]

Doering et al.

[11] Patent Number: 5,080,442
[45] Date of Patent: Jan. 14, 1992

[54] COLLECTOR CART

[75] Inventors: Charles W. Doering, Clarksville, Ind.; Garland E. Caudill, Bardstown, Ky.

[73] Assignee: Brinly-Hardy Co., Inc., Louisville, Ky.

[21] Appl. No.: 533,020

[22] Filed: Jun. 4, 1990

Related U.S. Application Data

[63] Continuation-in-part of Ser. No. 312,942, Feb. 21, 1989, abandoned.

[51] Int. Cl.⁵ ............................................ A01D 90/10
[52] U.S. Cl. ..................................... 298/6; 298/23 S; 298/23 C
[58] Field of Search ............. 298/6, 17 B, 17 T, 23 S, 298/23 A, 23 D, 23 DF, 23 C, 23 F; 56/202, 203, 205, 206, 16.6; 414/472

[56] References Cited

U.S. PATENT DOCUMENTS

| | | | |
|---|---|---|---|
| 296,938 | 4/1884 | Dees | 298/6 |
| 598,390 | 2/1898 | Pickrell | 298/6 |
| 739,012 | 9/1903 | Lehr | 298/6 |
| 765,432 | 7/1904 | Lehr | 298/6 |
| 831,428 | 9/1906 | Guiry | 298/6 |
| 1,024,959 | 4/1912 | Wolf | 298/6 |
| 2,748,964 | 6/1956 | Murphy | 414/472 |
| 2,837,230 | 6/1958 | Herterich | 414/472 |
| 3,351,384 | 11/1967 | Huck | 298/6 |
| 4,158,279 | 6/1979 | Jackson | 56/16.6 X |
| 4,476,668 | 10/1984 | Reilly | 56/202 |
| 4,569,187 | 2/1986 | Spikes et al. | 56/202 |
| 4,836,610 | 6/1989 | Doering et al. | 298/6 |

FOREIGN PATENT DOCUMENTS

| | | | |
|---|---|---|---|
| 1907053 | 9/1970 | France | 414/472 |
| 0171633 | 8/1986 | Japan | 298/235 |
| 0716890 | 2/1980 | U.S.S.R. | 298/23 F |
| 0000792 | of 1906 | United Kingdom | 298/23 F |
| 1047716 | 1/1966 | United Kingdom | 298/23 DF |
| 1226792 | 3/1971 | United Kingdom | 414/472 |

Primary Examiner—Robert J. Spar
Assistant Examiner—William M. Hienz
Attorney, Agent, or Firm—Frank C. Leach, Jr.

[57] ABSTRACT

A collector cart includes a body having an open rear end, which is closed by a canopy pivotally mounted adjacent its front end on the body adjacent its front end. The body has a support pivotally connected to caster wheel supports and a tow bar attached to a riding lawn mower hitch plate. Telescoping chutes connect the mower outlet with a canopy port to fill the cart with debris. When the cart is to be dumped, a first handle is rotated by an operator, who remains on the mower, to initially cause pivoting of a rear portion of a frame of the canopy, which includes a cover on the frame, relative to the body and the remainder of the canopy frame to release a locking connection of the rear portion of the canopy frame to the rear of the body. After the release is accomplished, a second handle is rotated by the operator to release the body from its tow bar with continued rotation of the second handle by the operator causing the body to pivot to a dumping position while the canopy pivots away from the body due to a rope of a fixed length connecting the top front portion of the canopy frame to the mower or a rod of a fixed length connecting the top front portion of the canopy frame to the tow bar.

9 Claims, 21 Drawing Sheets

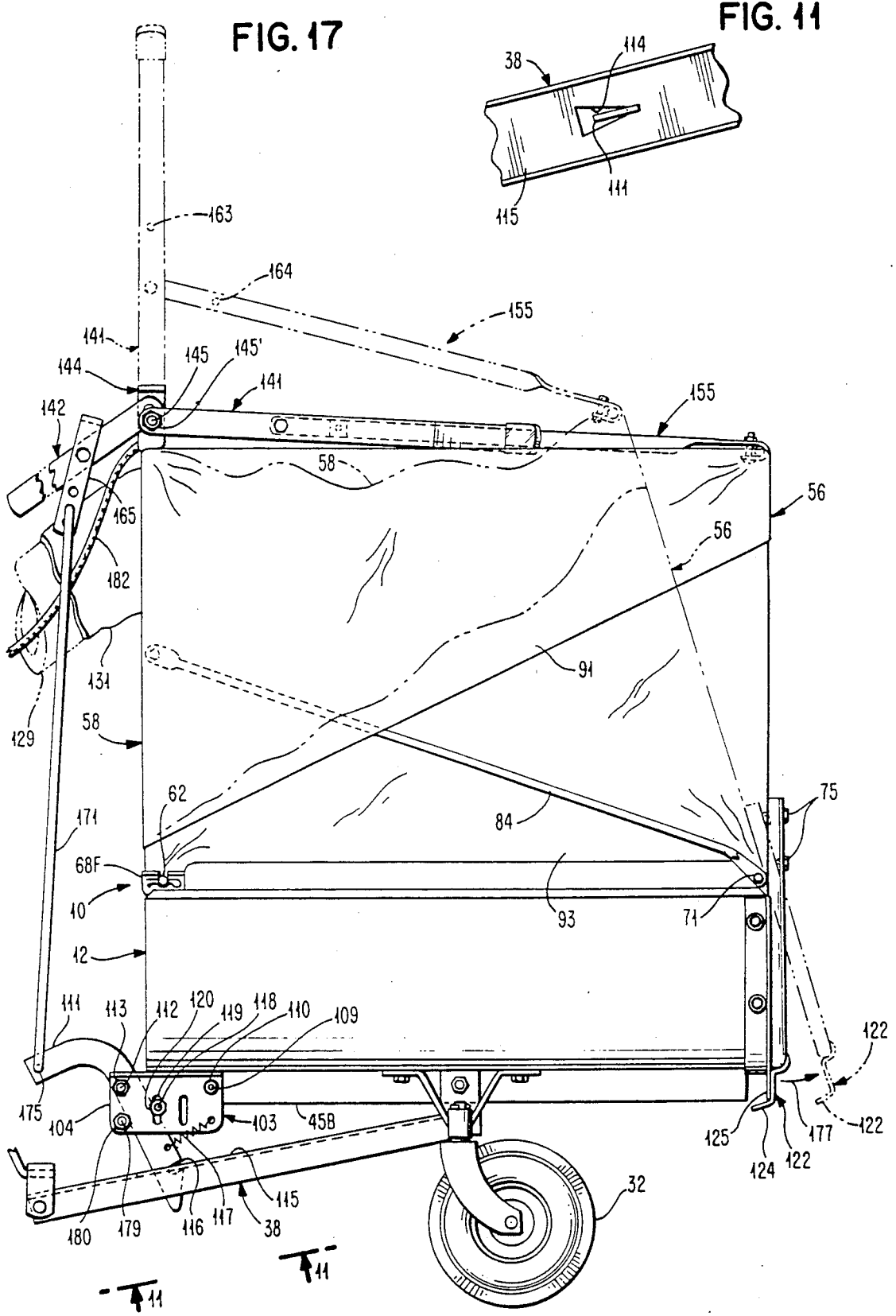

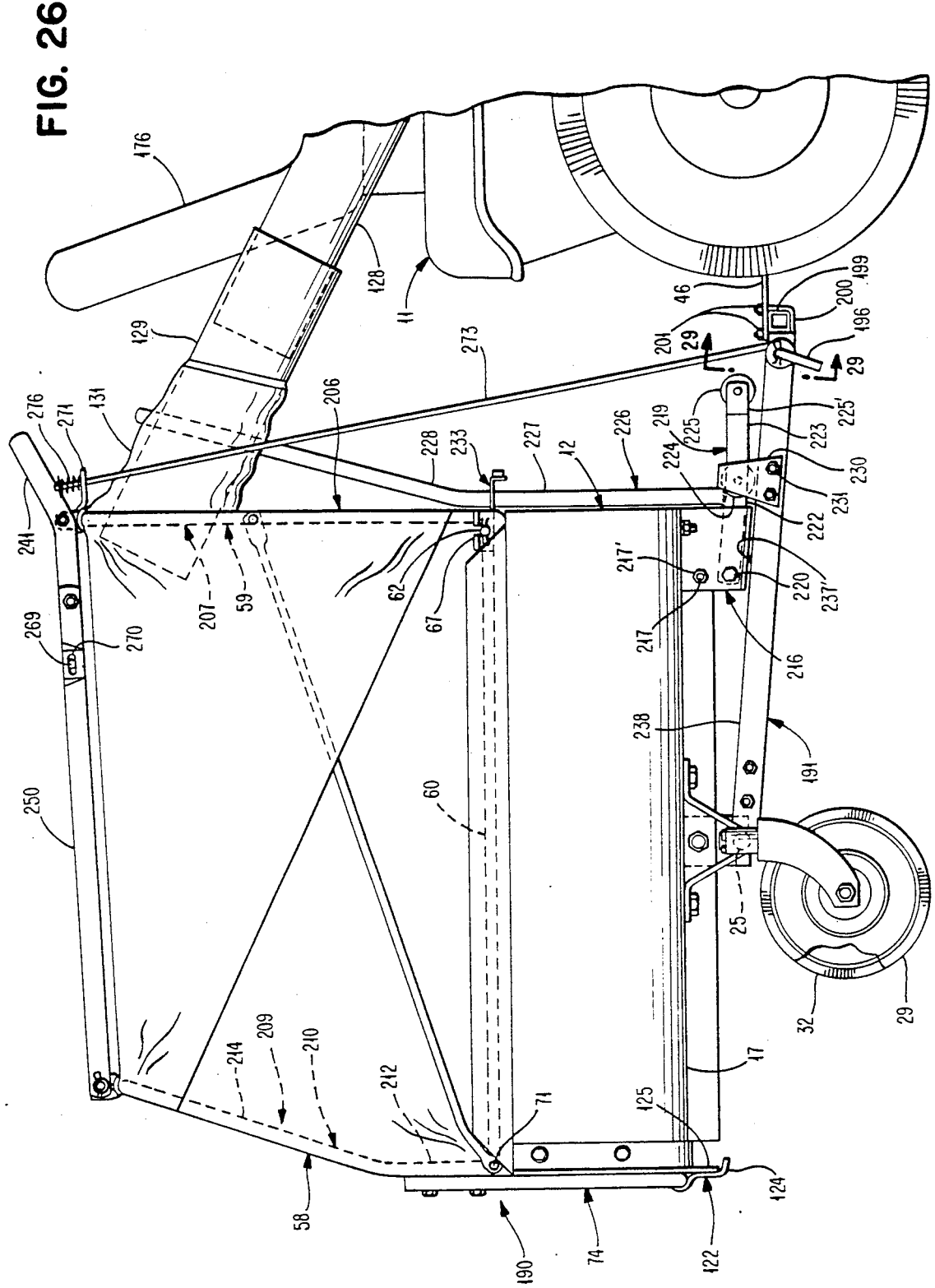

COLLECTOR CART

This is a continuation-in-part of U.S. application Ser. No. 07/312,942, filed Feb. 21, 1989, now abandoned.

This invention relates to a cart for collecting debris and, more particularly, to a collector cart having a body pivotally mounted relative to its wheels and a canopy pivotally mounted on the body.

An operator of a riding lawn mower wants to complete cutting of a lawn in the shortest time period. At the same time, the operator of the riding mower normally desires to have all of the debris thrown from the outlet of the mower such as grass clippings, thatch, and leaves, for example, collected so that they do not fall on the cut lawn. Thus, it is desired for the thrown debris to be collected in a suitable collector.

Various types of collectors for collecting debris produced from a riding lawn mower have previously been suggested. These have included collector carts such as the collector carts of U.S. Pat. Nos. 3,522,695 to Musgrave and 4,158,279 to Jackson. The collection of thrown debris from a combine, for example, is disclosed in U.S. Pat. No. 3,351,384 to Huck.

Dumping carts having a pivotally mounted body with a cover that is moved away from the body prior to dumping are illustrated to in each of U.S. Pat. Nos. 831,428 to Guiry and 1,024,959 to Wolf. British patent 1,047,716 to Reeves has a cover that closes the rear open end of a transport container and a portion of the top of the container with the cover pivoting to an open position in response to pivoting of the container to its dumping position.

The aforesaid Jackson patent has a cart towed by a riding lawn mower with the cart including a body, which is pivotally mounted on an axle of wheels of the cart and a canopy pivotally mounted at the front end of the cart. When the debris in the cart is to be dumped, it is necessary for the operator of the riding lawn mower to get off of the lawn mower, unlock the rear of the canopy from the rear of the body, and then push the rear end of the canopy upwardly to cause the canopy to pivot relative to the body with the body pivoting about the axle of the cart wheels in response to the canopy being pivoted.

Therefore, the collector cart of the aforesaid Jackson patent has the problem of the engine being turned off, either manually or automatically, when the operator gets off the seat. Additionally, the body of the cart of the aforesaid Jackson patent has a slanting rear wall, which engages the ground during dumping to support the body, so that all of the debris within the canopy and the body cannot fall therefrom by gravity. Accordingly, it is necessary for the operator to have to clean out a portion of the debris within the collector cart body when dumping the debris from the cart of the aforesaid Jackson patent.

Another problem with the collector cart of the aforesaid Jackson patent is that the debris is compressed within the canopy and the cart body so as to bulge against the canopy. This produces a substantial resistance to the normal lifting forces to raise the canopy from its closed position.

A further problem with the collector cart of the aforesaid Jackson patent is that the wheels are mounted on the ends of an axle and must track the mower. Thus, it is sometimes difficult to back up the collector cart of the aforesaid Jackson patent without jackknifing. Since it is necessary to normally back up the cart to where the debris is to be dumped, the fixed tracking arrangement of the cart wheels presents a problem for the operator of the riding mower to correctly maneuver the cart in response to motions of the mower.

One satisfactory solution to the foregoing problems is a collector cart shown and described in U.S. Pat. No. 4,836,610 to Charles W. Doering et al. Each of the two embodiments of the collector cart of the present invention is an improvement of the collector cart of the aforesaid Doering et al patent in that each avoids the exterior linkage mechanism of the aforesaid Doering et al patent. Each also eliminates any requirement for holding the canopy and the body in the dumping position.

Each of the collector carts of the present invention satisfactorily solves the foregoing problems through providing a collector cart for use with a riding lawn mower in which it is not necessary for the operator to get off of the riding lawn mower when it is desired to dump debris from the collector cart. Therefore, the engine does not have to be turned off.

Each of the collector carts of the present invention also eliminates the debris from providing a resistance to normal lifting of the canopy when it is to be opened. This is accomplished through pivoting the rear of the canopy frame relative to the remainder of the canopy frame before any pivoting occurs between the canopy frame and the cart body. This pivoting of the rear of the canopy frame relative to the remainder of the canopy frame also disconnects a locking arrangement for locking the rear of the canopy frame to the rear of the cart body so that the canopy is locked when in use but is still unlocked when desired without the operator having to get off of the riding lawn mower.

A second embodiment of the collector cart of the present invention is an improvement of a first embodiment in that the second embodiment has its canopy designed to reduce the friction of a heavily loaded cart through changing the shape of the canopy at its rear. This change in the upper portion of the rear of the canopy produces an increasing area from the top of the canopy to the bottom to allow the debris to fall more easily from the canopy through the bottom.

Each of the collector carts of the present invention also is capable of dumping its entire contents. This is accomplished through forming the cart body with an open rear end, which is closed by the canopy. Accordingly, the cart body has no rear wall to block the flow of debris by gravity from the cart body when the cart is in its dumping position.

The movement of each of the collector carts to its dumping position is accomplished through the operator, while seated on the riding lawn mower, initially grasping a release handle accessible from the front of the cart body to unlock the canopy from the cart body. After movement of the release handle is completed, a dump handle is grasped by the operator while seated on the riding lawn mower to cause pivoting of the cart body to its dumping position. The canopy responds to the pivoting of the cart body through having its upper front end connected to the riding lawn mower by connecting means of a fixed length such as a rope, for example, in the first embodiment or its upper front end connected to its tow bar by connecting means of a fixed length such as a rod, for example, in the second embodiment.

The second embodiment of the collector cart of the present invention also mounts the dump handle so that a relatively large load in the body of the collector cart because of the debris being heavy, wet, compacted grass, for example, is overcome without a substantial effort. This is accomplished through locating the pivot for the dump handle adjacent the front lower end of the body.

Each of the collector carts of the present invention overcomes the tracking problem of the collector cart of the aforesaid Jackson patent by utilizing caster wheels. These enable the collector cart to be moved in a rearward direction in response to the riding lawn mower without substantial maneuvering by the operator of the riding lawn mower while still being capable of tracking the mower in the forward direction.

An object of this invention is to provide a collector cart for collecting debris.

Another object of this invention is to provide a collector cart having two actuating mechanisms.

Other objects of this invention will be readily perceived from the following description, claims, and drawings.

The attached drawings illustrate preferred embodiments of the invention, in which:

FIG. 11 is a bottom plan view of a portion of the tow bar and showing a portion of a latch utilized to lock the body of the cart to the tow bar to prevent pivoting of the body and taken along line 11—11 of FIG. 17;

FIG. 17 is a fragmentary left side elevational view of a portion of the cart of FIG. 1 and showing two actuating mechanisms accessible from the front of the cart with the cart in its towed position in solid line position and the initial motion of one of the actuating mechanisms to unlock the frame of the canopy from the cart body in phantom line position;

FIG. 26 is a right side elevational view of another embodiment of the cart of the present invention attached to a riding lawn mower and showing the cart in its towed position;

Figure 27:
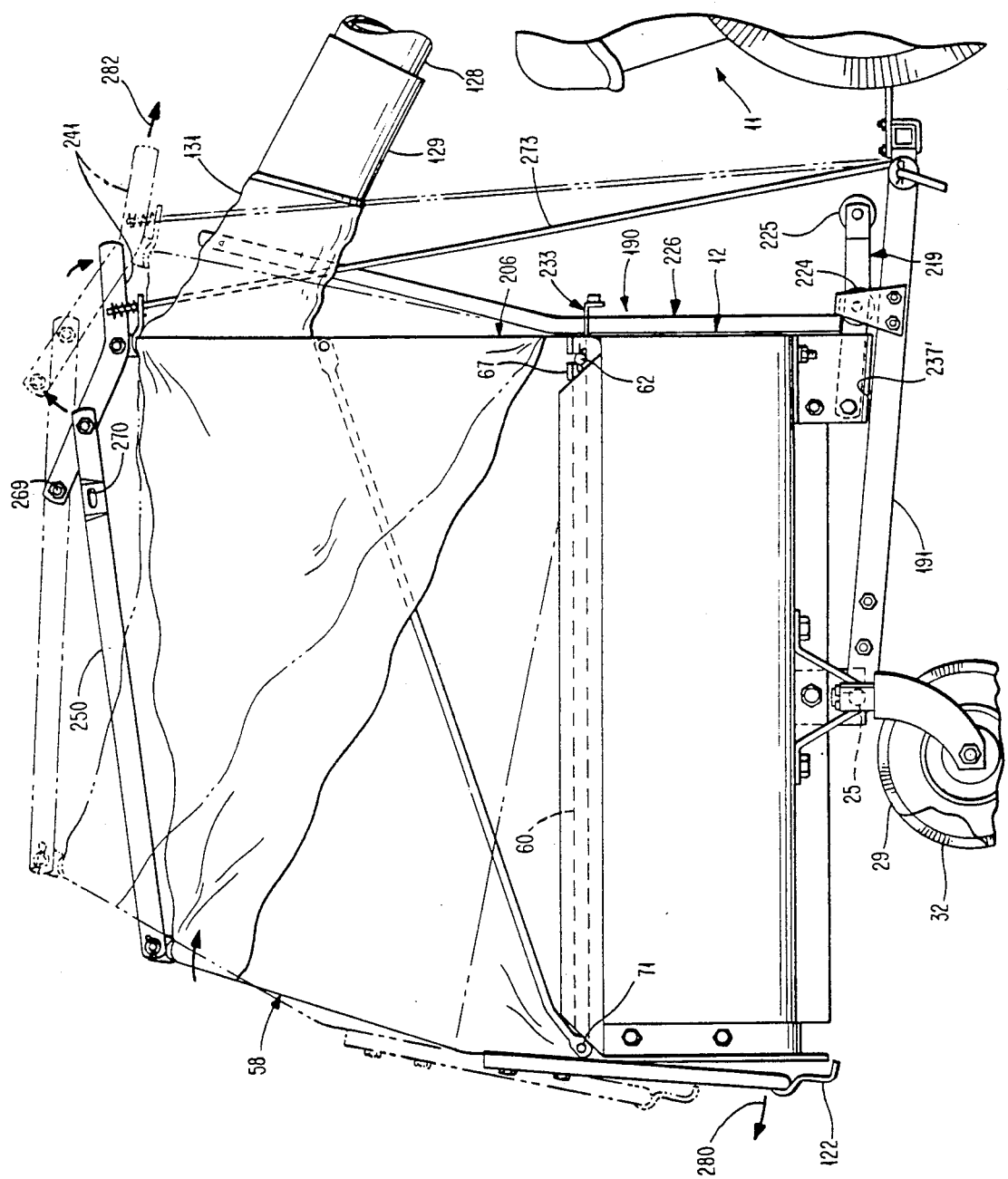
Figure 28:
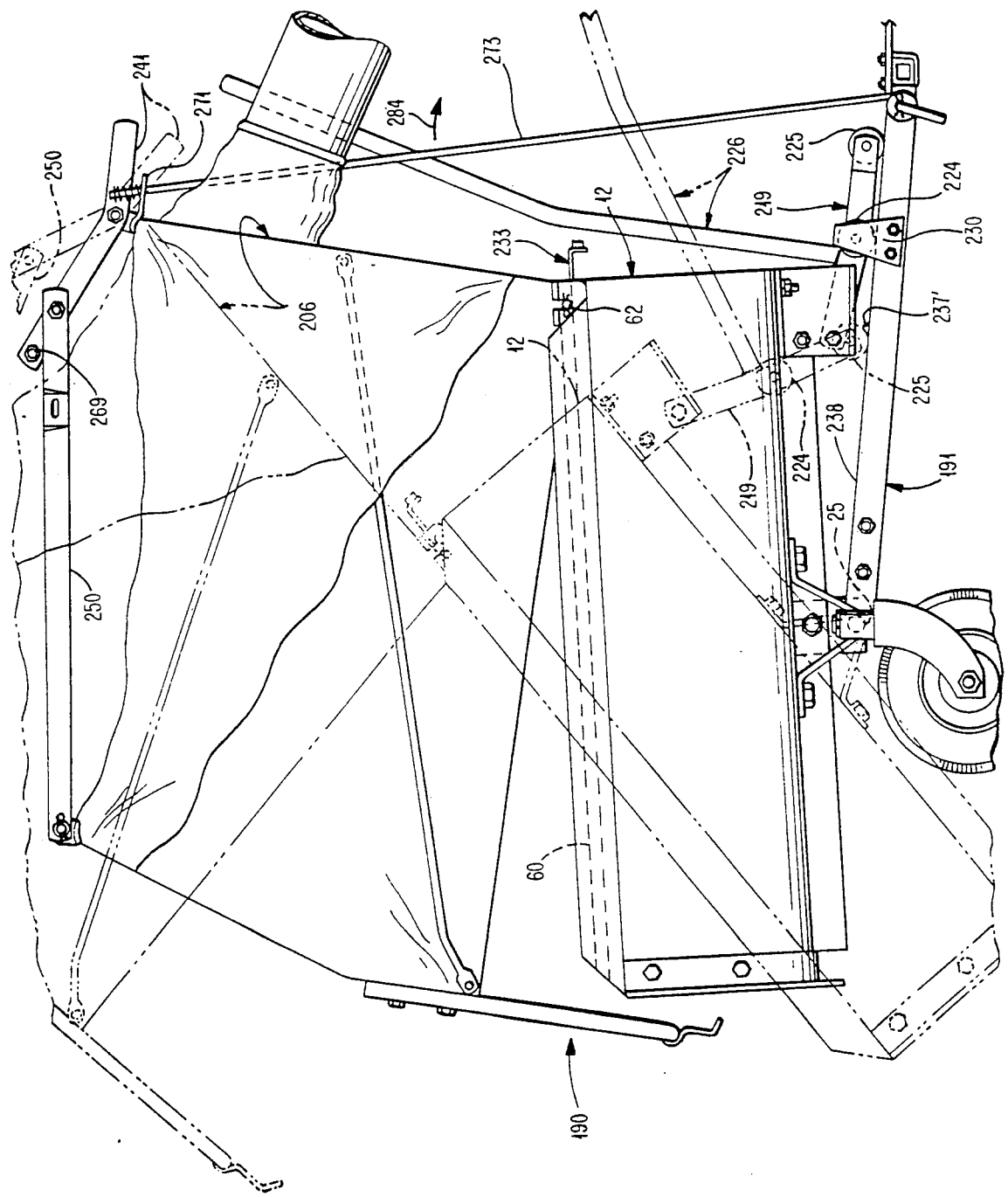
Figure 29:
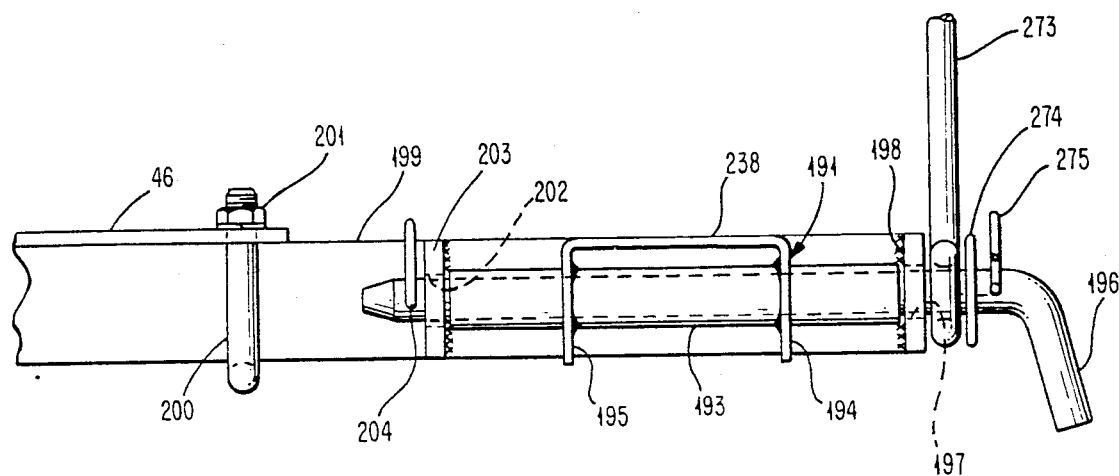
Figure 36:
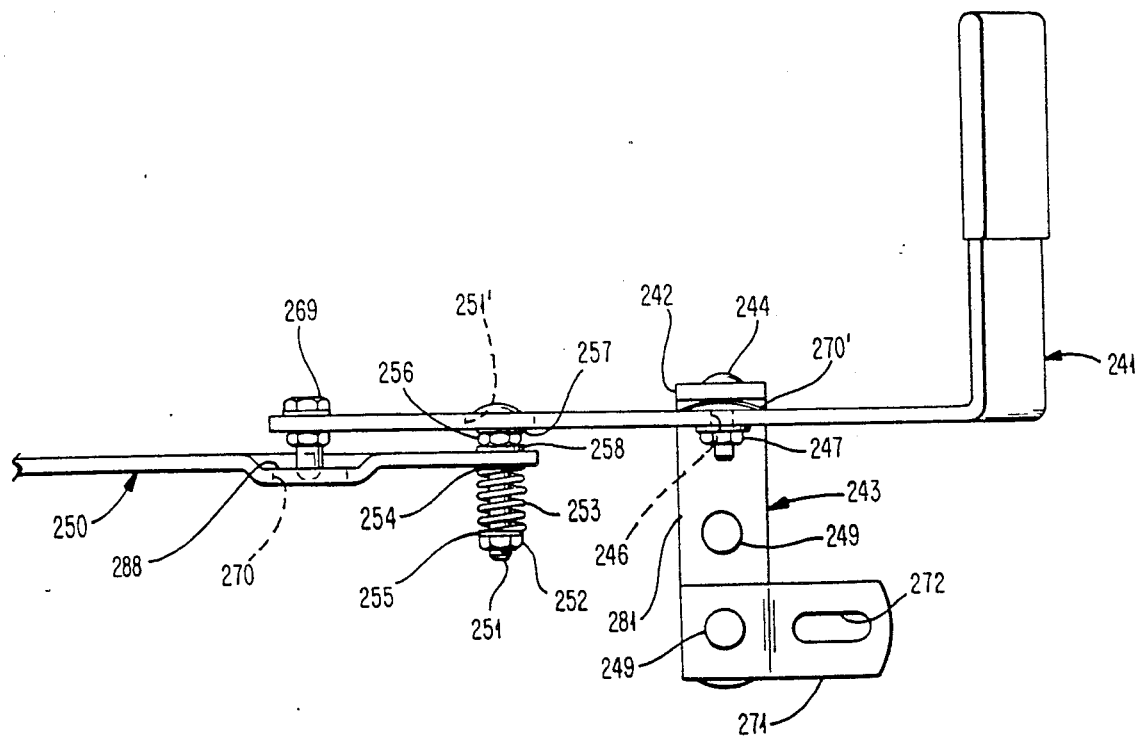
Figure 30:
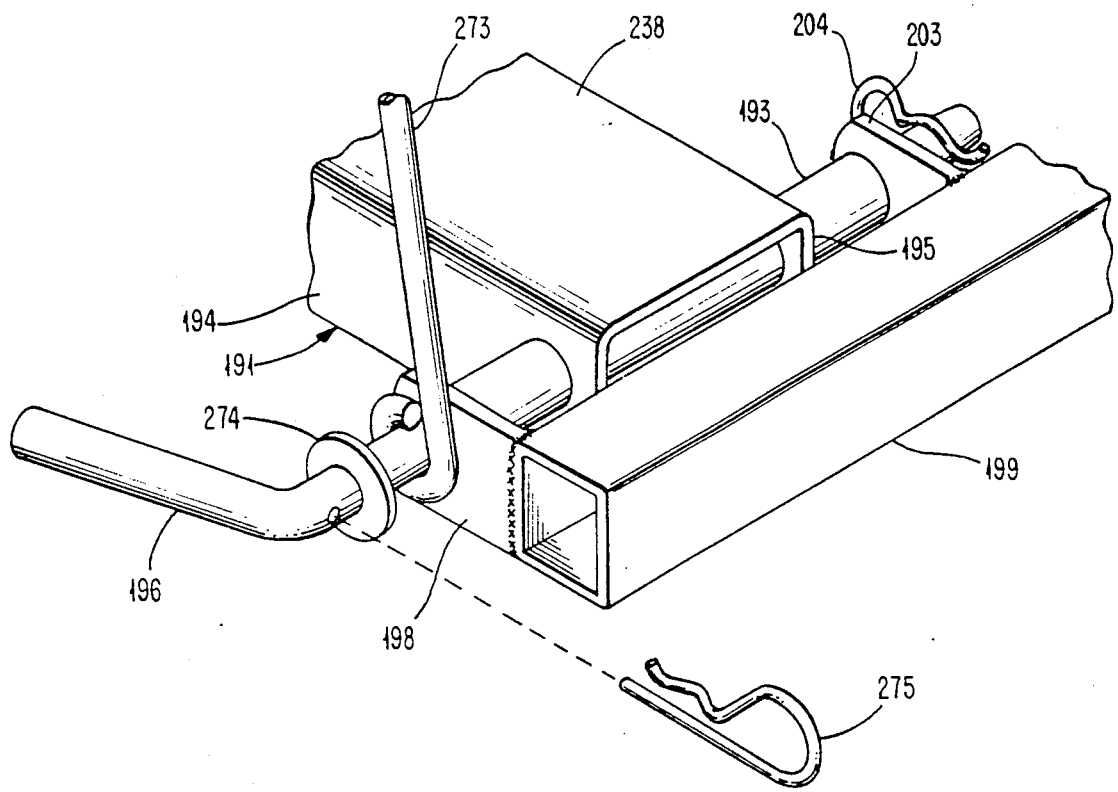
Figure 37:
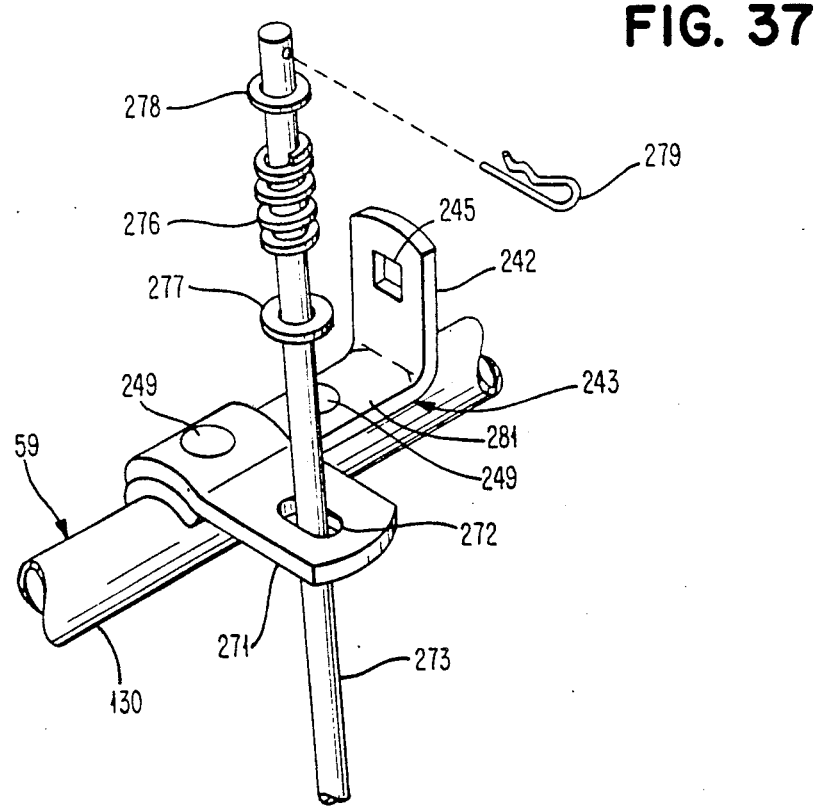
Figure 31:
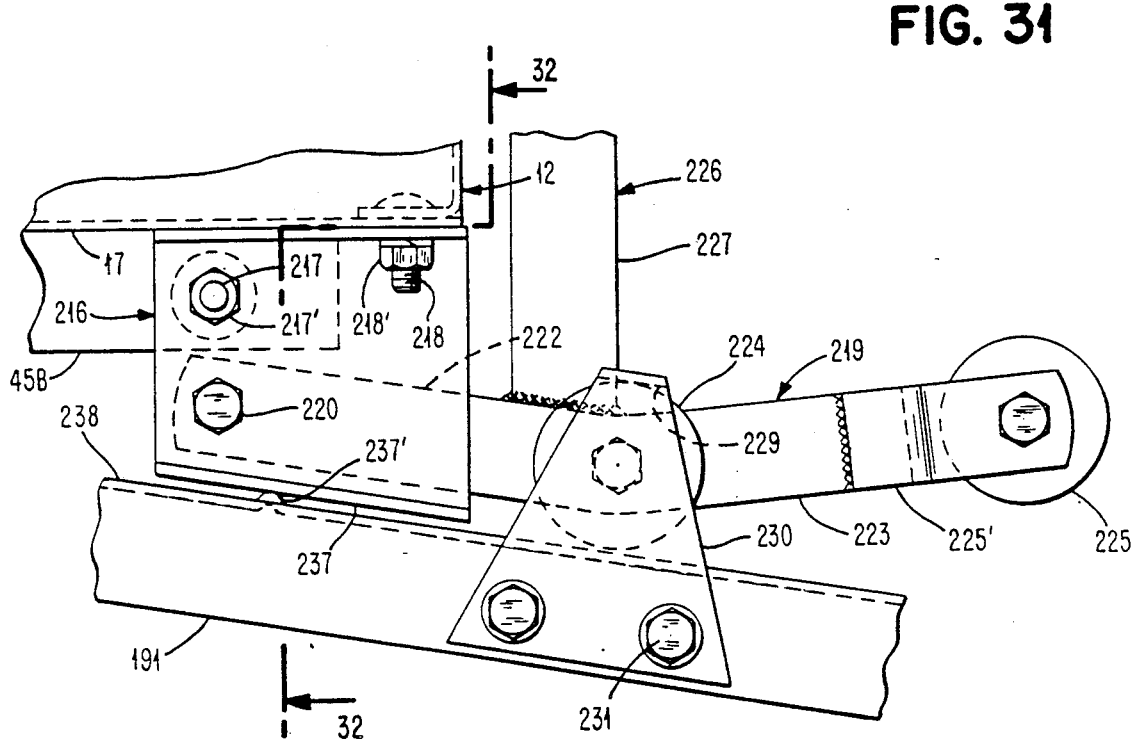
Figure 32:
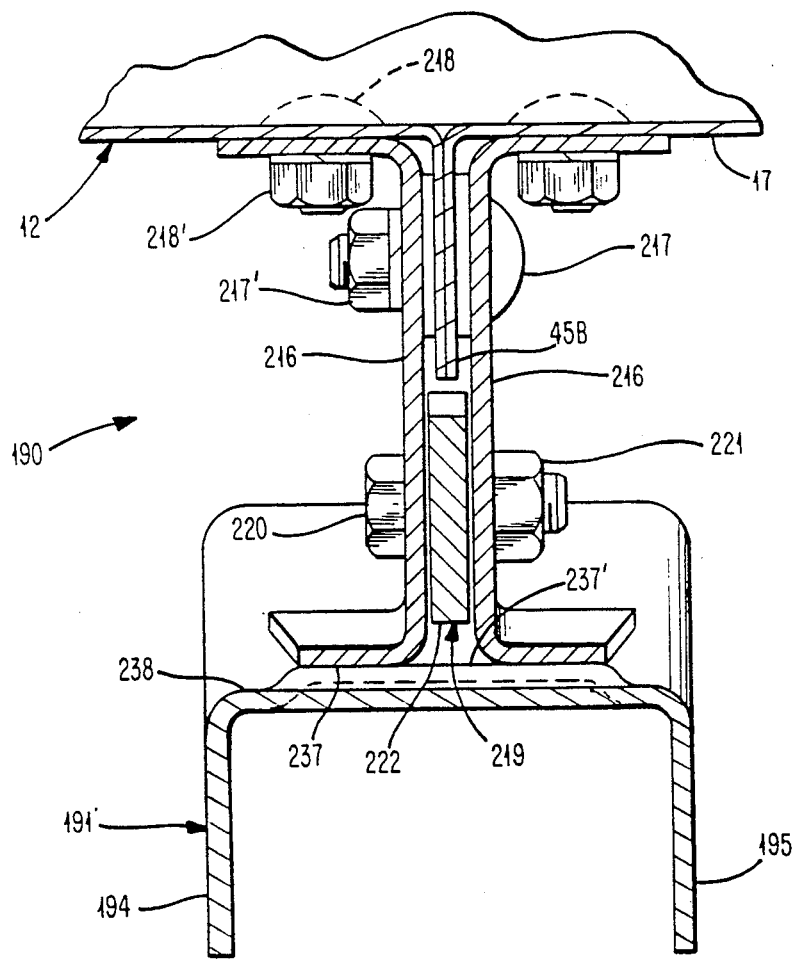
Figure 33:
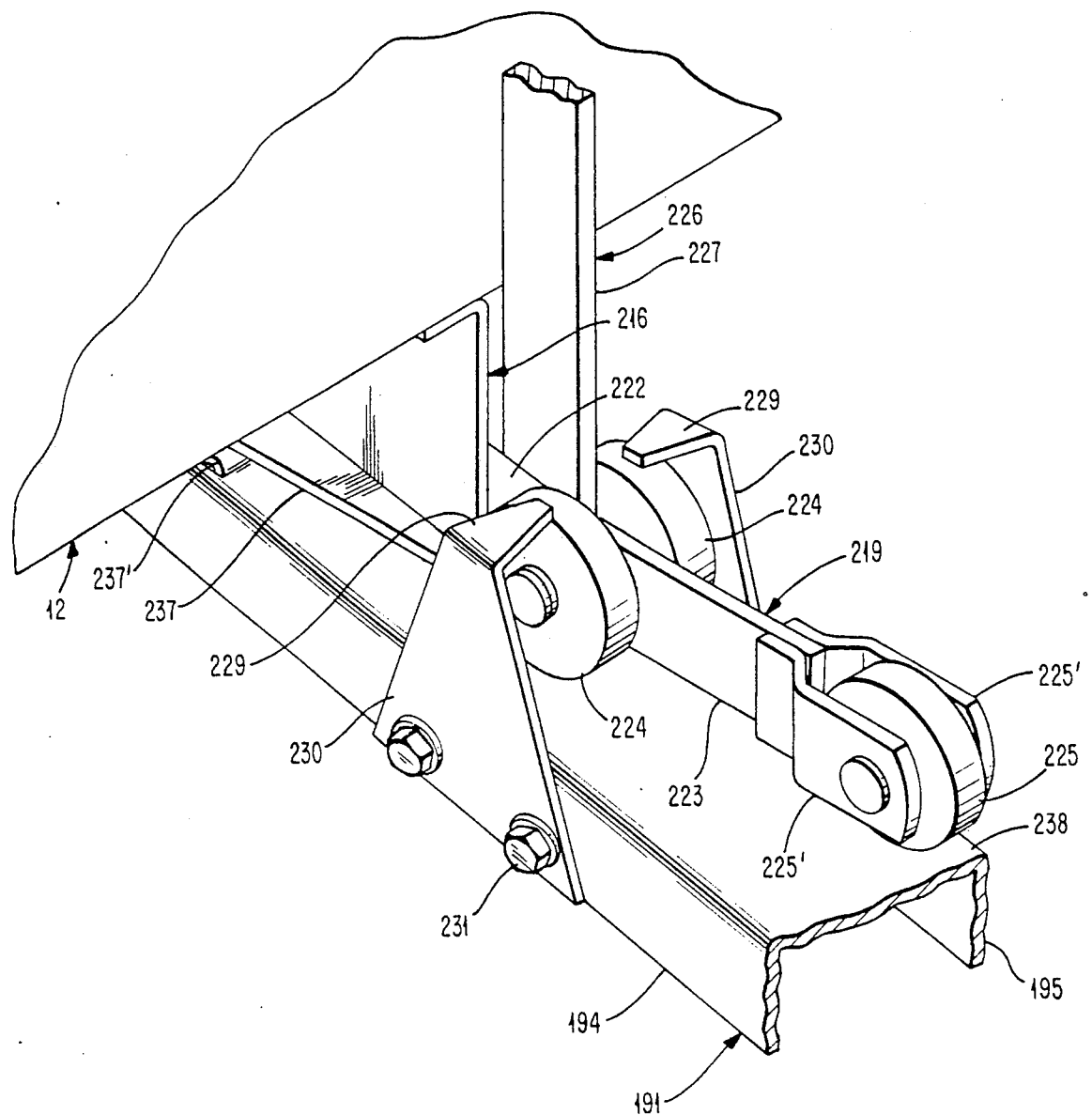
Figure 34:
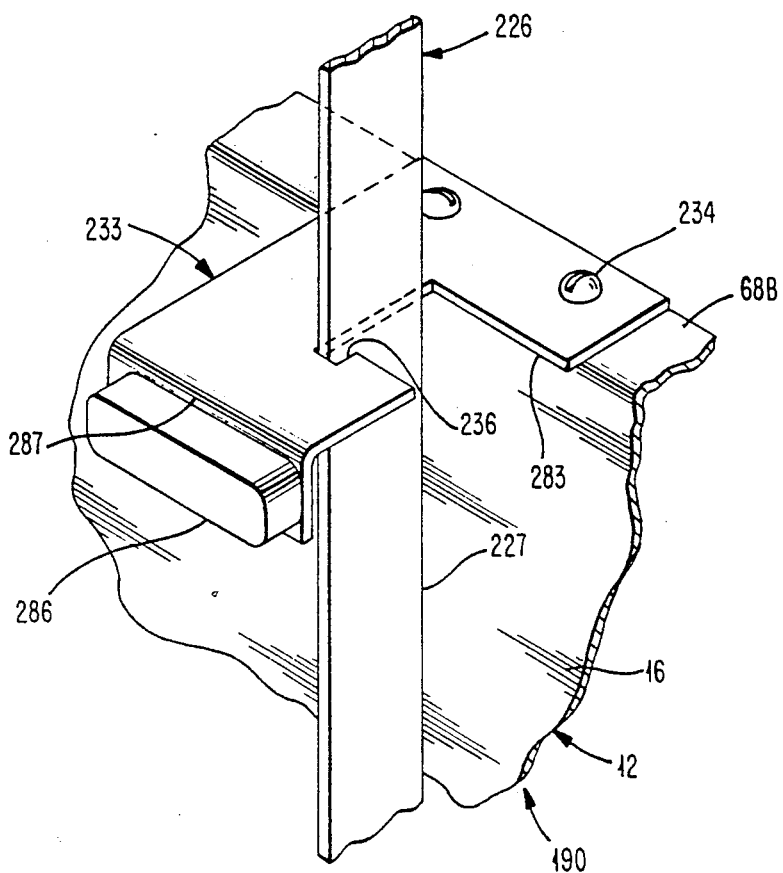
Figure 35:
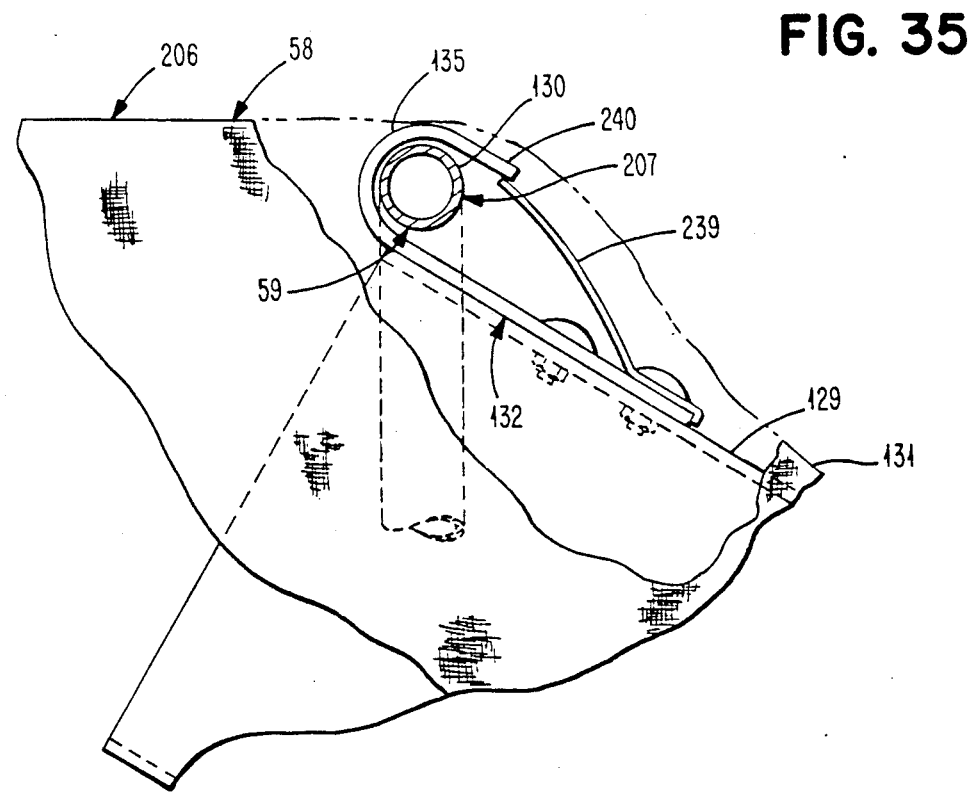
Figure 38:
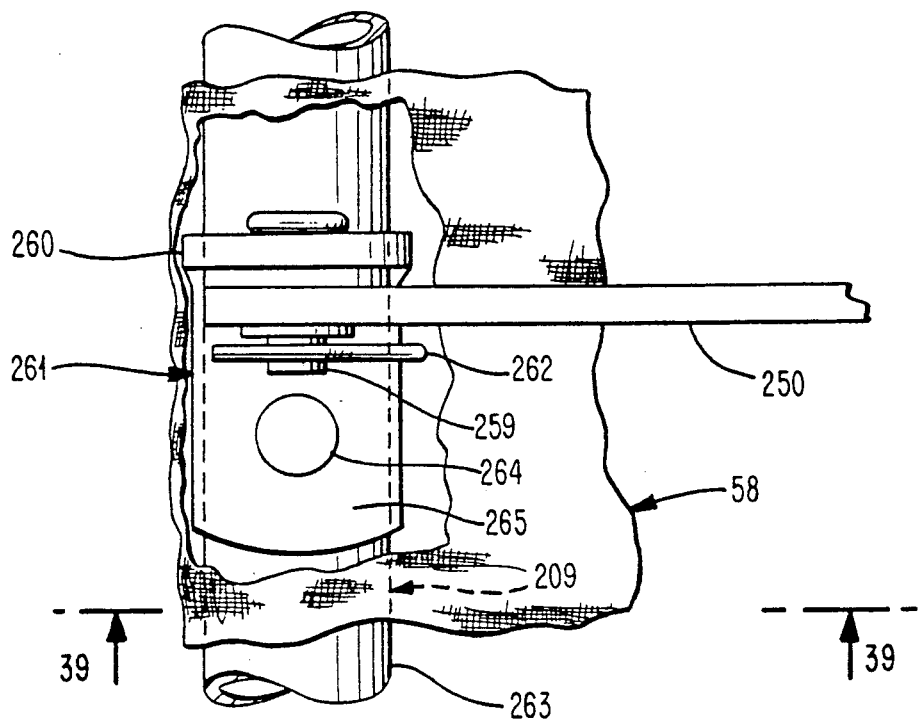
Figure 39:
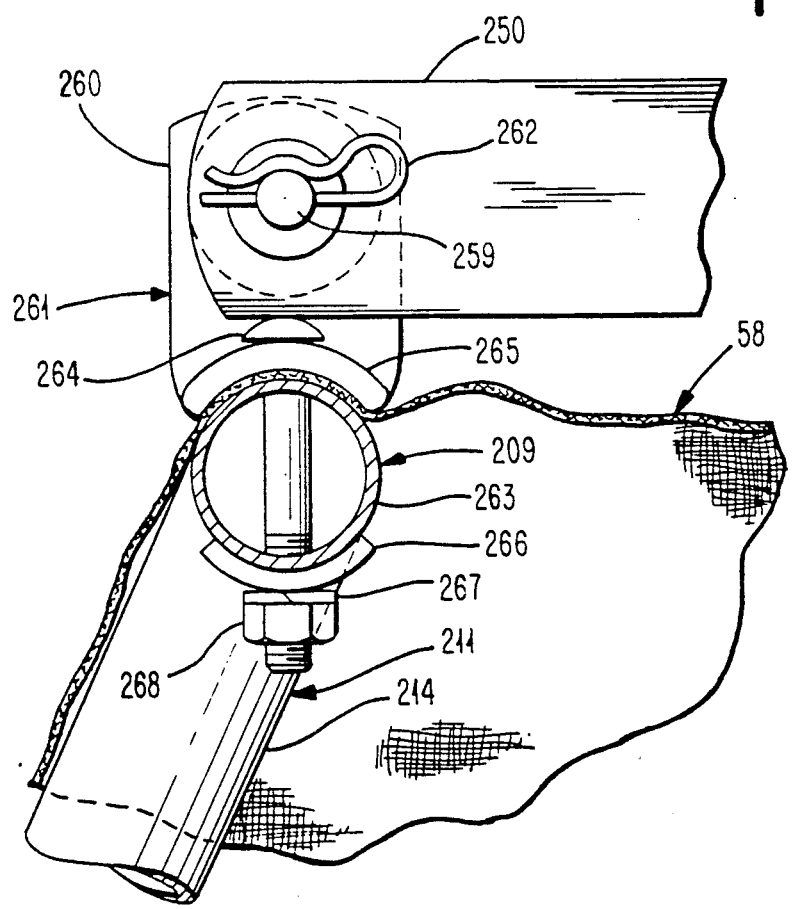
Figure 40:
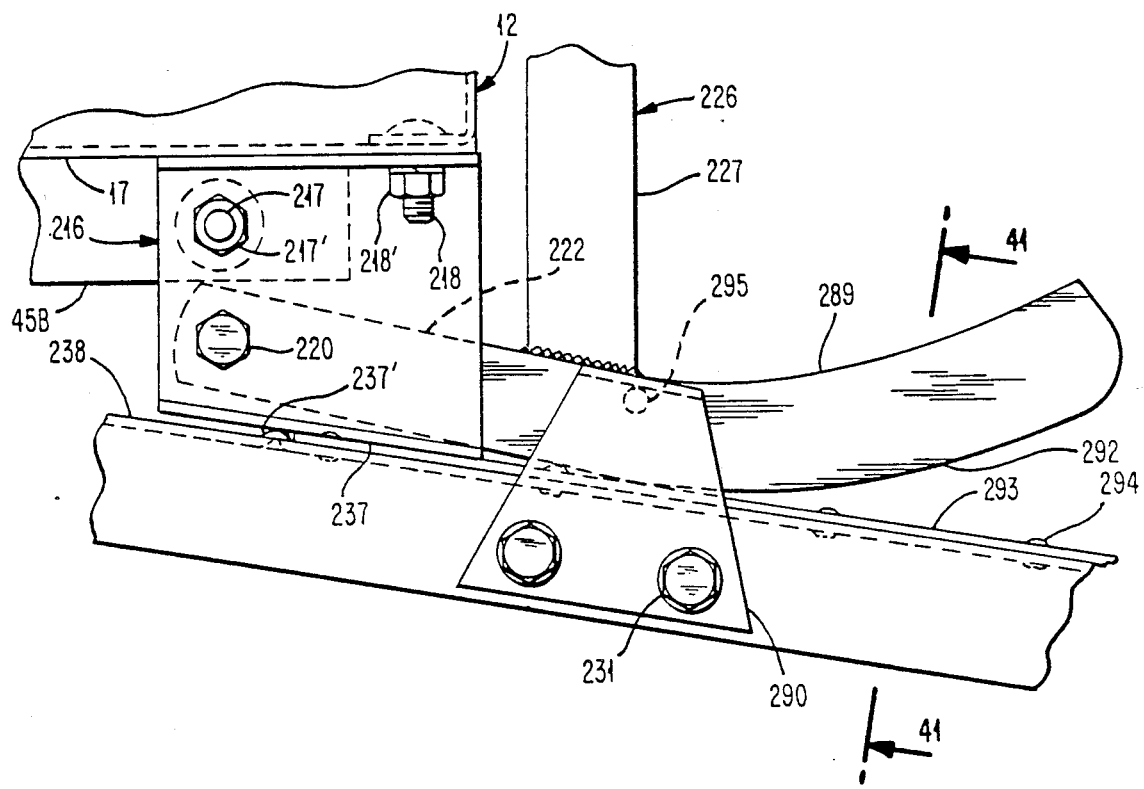
Figure 41:
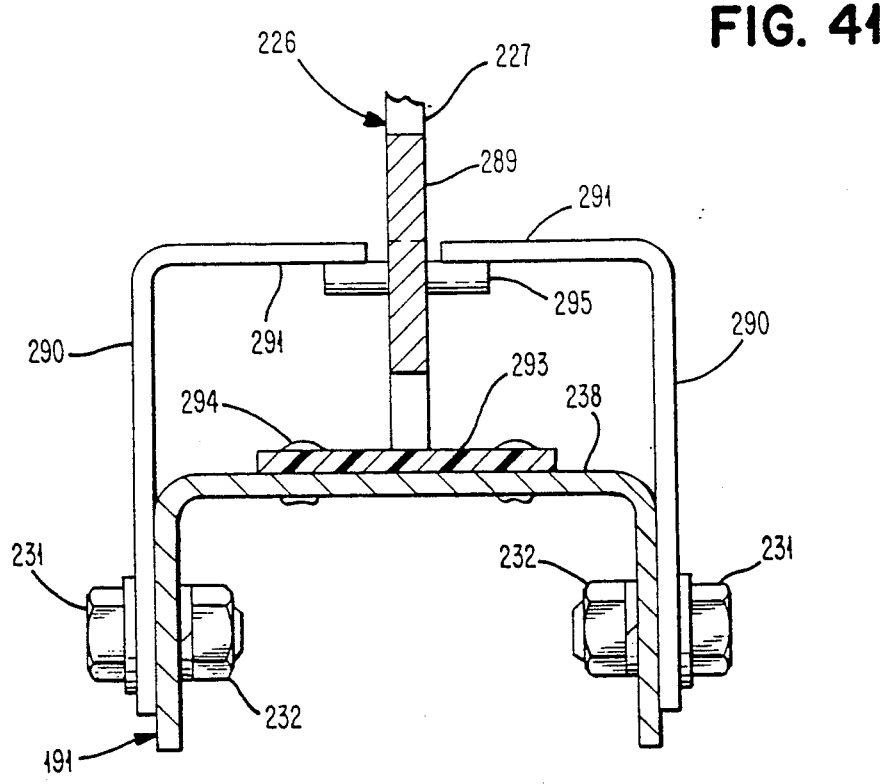

FIG. 27 is a right side elevational view of the cart of FIG. 26 and showing two actuating mechanisms accessible from the front of the cart with initial motion of a first of the actuating mechanisms to unlock the frame of the canopy from the cart body in solid line position and the continued motion of the first actuating mechanism to pivot the frame of the canopy further from the cart body in phantom line position;

FIG. 28 is a right side elevational view, similar to FIG. 27, of the cart of FIG. 26 and showing the initial motion of a second of the two actuating mechanisms in solid line position and the cart body and canopy in their dumping positions in phantom line position;

FIG. 29 is a fragmentary rear elevational view, partly in section, showing the connection of a tow bar of the cart and a hitch plate of the riding lawn mower and taken along line 29—29 of FIG. 26;

FIG. 30 is an enlarged fragmentary perspective view of the tow bar and its cooperating structure;

FIG. 31 is an enlarged fragmentary side elevational view of a portion of the cart body of FIG. 26 showing a portion of the second actuating mechanism;

FIG. 32 is a fragmentary sectional view, partly in elevation, of portions of the cart body and the second actuating mechanism and taken along line 32—32 of FIG. 31;

FIG. 33 is an enlarged fragmentary perspective view of a portion of the second actuating mechanism;

FIG. 34 is an enlarged fragmentary perspective view of a portion of the collector cart of FIG. 26 and showing a retaining mechanism for retaining the second actuating mechanism against motion;

FIG. 35 is a fragmentary elevational view, partly in section, of a portion of the canopy frame and showing its connection to a chute transporting debris to the interior of the canopy;

FIG. 36 is a top plan view of an arrangement for mounting the first actuating mechanism;

FIG. 37 is a perspective view with some parts omitted for clarity purposes of an arrangement for receiving an end of a rod for causing the canopy to pivot in the opposite direction to that in which the cart body pivots during activation by the second actuating mechanism;

FIG. 38 is a fragmentary top plan view showing the connection of the first actuating mechanism to the rear frame of the canopy frame;

FIG. 39 is a fragmentary sectional view, partly in elevation, showing the connection of the first actuating mechanism to the rear frame of the canopy frame and taken along line 39—39 of FIG. 38;

FIG. 40 is an enlarged fragmentary side elevational view of a portion of the cart body of FIG. 26 showing a modification of a portion of the second actuating mechanism; and FIG. 41 is a fragmentary sectional view, partly in elevation, of a portion of the cart body and the modified portion of the second actuating mechanism of FIG. 40 and taken along line 41—41 of FIG. 40 with some parts omitted.

Figure 1:
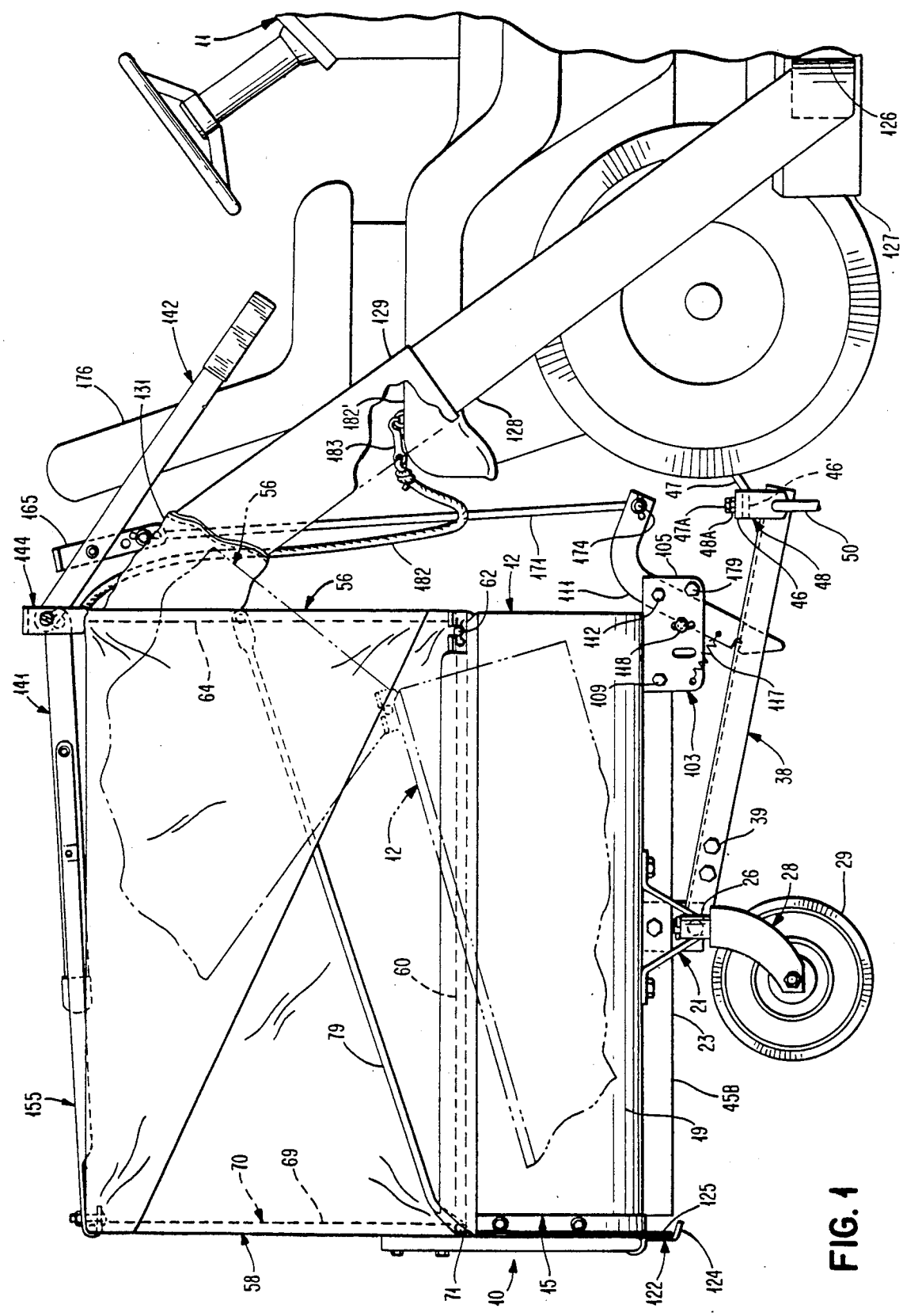
FIG. 1 is a right side elevational view of one embodiment of the cart of the present invention attached to a riding lawn mower and showing the cart in its towed position in solid lines and in a position just prior to its dumping position in phantom lines.
Figure 2:
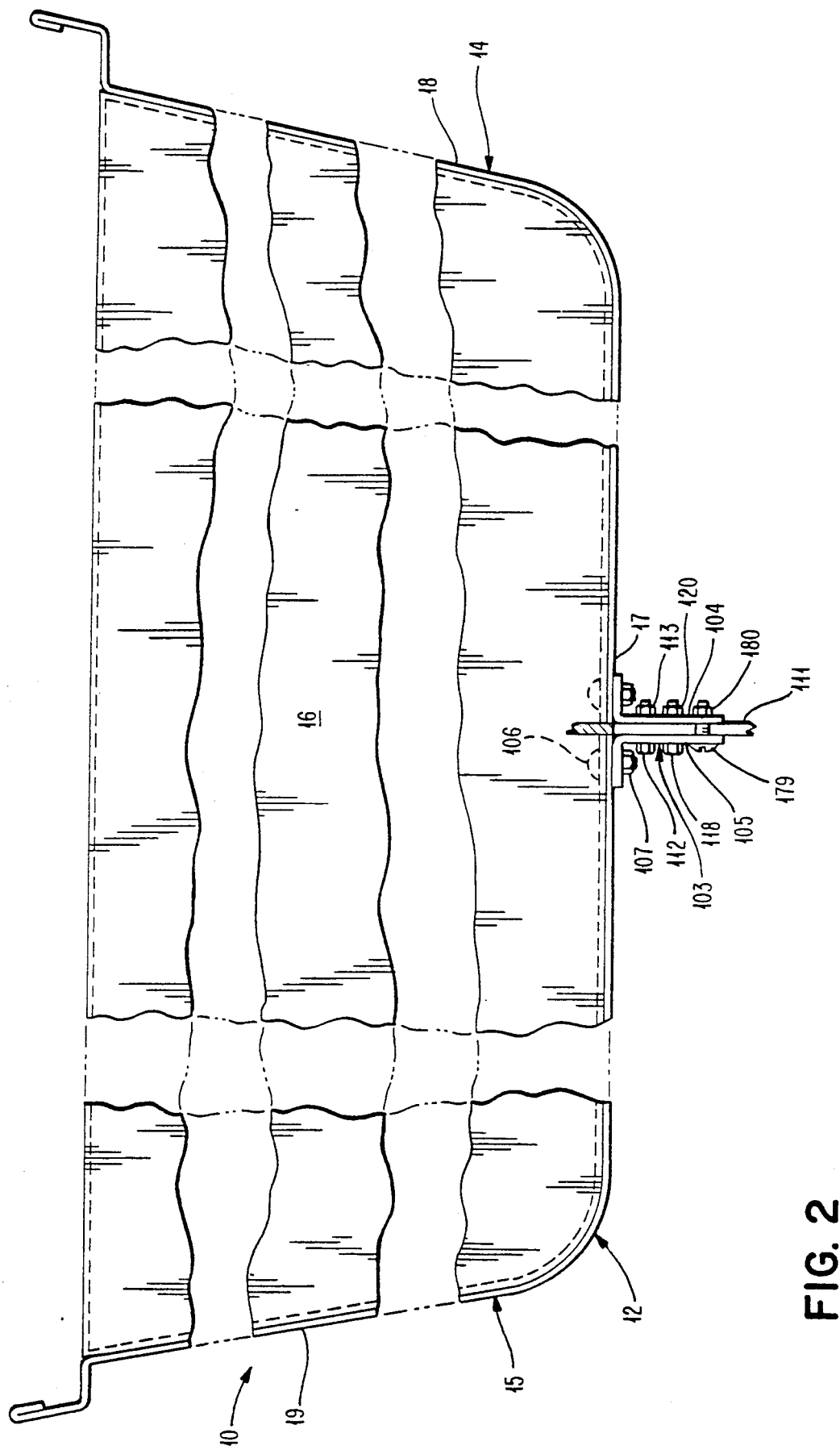
FIG. 2 is a front elevational view of a body of the cart of FIG. 1.

Referring to the drawings and parricularly FIG. 1, there is shown a collector cart 10 for collecting thrown debris such as grass clippings and leaves, for example, from a riding lawn mower 11, for example, which tows or pulls the collector cart 10 behind it. The collector cart 10 includes a body 12 formed of two mirror image portions 14 (see FIG. 2) and 15 and a front wall 16. The front wall 16 and the mirror image portions 14 and 15 are formed in substantially the same manner as shown in U.S. Pat. No. 4,582,333 to Doering and connected to each other in the same manner as shown in the aforesaid Doering patent.

The mirror image portions 14 and 15 provide a bottom wall 17 of the body 12. The mirror image portion 14 provides a side wall 18 of the body 12, and the mirror image portion 15 provides a side wall 19 of the body 12. The body 12 has an open rear end 20 (see FIG. 4) between the side walls 18 (see FIG. 2) and 19.

The bottom wall 17 of the body 12 has an axle support 21 (see FIG. 6) attached thereto by suitable means such as bolts 22 and nuts 23, for example. The axle support 21 has retainers 24 to receive a dump pivot bar 25 having caster pivot tubes 26 and 27 fixed to its other ends.

A caster wheel mount 28, which has a caster wheel 29 rotatably supported thereby, has a vertical post 30 extending through the caster pivot tube 26 and held therein by a cotter pin 31 extending through a bore in the upper end of the vertical post 30 of the caster wheel mount 28. A caster wheel 32 is similarly mounted in the caster pivot tube 27.

The dump pivot bar 25 is supported in an opening (not shown) in a plate 36 and fixed thereto by welding. The plate 36 is secured to a side wall 37 of a U-shaped tow bar 38 by bolts 39 and nuts 40. The dump pivot bar 25 also is supported in an opening (not shown) in a plate 42 and fixed thereto by welding. The plate 42 is secured to a side wall 43 of the tow bar 38 by bolts 44 and nuts 45.

The dump pivot bar 25 also extends through a cut-out slot in the bottom edge of an axle support plate 45A, which is supported by bottom flanges 45B on the body 12. The axle support plate 45A aids in supporting the dump pivot bar 25.

Accordingly, the tow bar 38 and the caster wheels 29 and 32 are integral with each other. The body 12 is pivotally mounted with respect to the caster wheels 29 and 32 and the tow bar 38 through the body 12 being rotatably mounted on the dump pivot bar 25.

Figure 5:
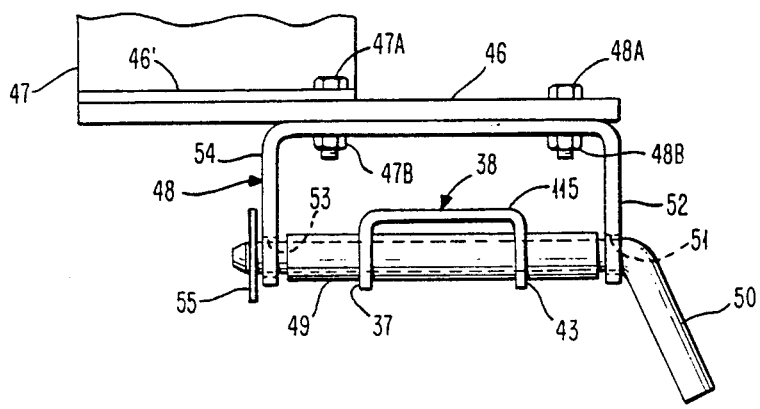
FIG. 5 is a fragmentary rear elevational view, partly in section, showing the connection of a tow bar of the cart and a hitch bar of the riding lawn mower.

The tow bar 38 has its forward end attached to a hitch bar 46 (see FIG. 5) of the riding lawn mower 11 (see FIG. 1). The hitch bar 46 (see FIG. 5) extends laterally from a horizontal portion 46' of a hitch plate 47, which is mounted on the rear of the riding lawn mower 11 (see FIG. 1), and is secured thereto by suitable means such as bolts 47A (see FIG. 5) and nuts 47B, for example. The hitch bar 46 has a U-shaped clevis 48 secured thereto by bolts 48A and nuts 48B, for example, in addition to the bolts 47A and the nuts 47B and extending downwardly therefrom. It should be understood that the clevis 48 could extend upwardly from the hitch bar 46 if the hitch plate 47 were mounted lower on the riding lawn mower 11 (see FIG. 1).

The tow bar 38 (see FIG. 5) has a hollow tube 49 secured to the side walls 37 and 43 and extending therefrom to receive a pin 50, which extends through an opening 51 in a side wall 52 of the clevis 48, the hollow tube 49, and an opening 53 in a side wall 54 of the clevis 48. A cotter pin 55 retains the pin 50 in position so as to connect the tow bar 38 to the hitch bar 46 whereby the collector cart 10 (see FIG. 1) can be towed or pulled by the riding lawn mower 11. Thus, the tow bar 38 constitutes pull connecting means.

The connection between the tow bar 38 (see FIG. 5) and the hitch bar 46 allows relative movement therebetween about the horizontal axis of the pin 50 extending through the hollow tube 49 for the unevenness of the ground. The slight spacing of the ends of the hollow tube 49 from the side walls 52 and 54 of the clevis 48 enables a very limited pivoting about a vertical axis between the tow bar 38 and the hitch bar 46.

The collector cart 10 (see FIG. 1) also includes a canopy 56 mounted solely for pivotal movement with respect to the body 12 and enclosing the open top of the body 12 and closing the open rear end 20 (see FIG. 4) of the body 12 to form an enclosed chamber therebetween. The canopy 56 (see FIG. 3) includes a frame 57 and a cover material 58 supported by the frame 57.

The frame 57 includes a front upper frame 59, which is U-shaped and constitutes a front frame support, pivotally connected to the front ends of a pair of side tubes or elements 60 and 61. A rod 62 extends through aligned openings 63 (see FIG. 10) in the side tube 60, aligned openings (not shown) in a substantially vertical leg 64 (see FIG. 3) of the front upper frame 59, aligned openings (not shown) in a substantially vertical leg 65 of the front upper frame 59, and aligned openings (not shown) in the side tube 61.

Figure 10:
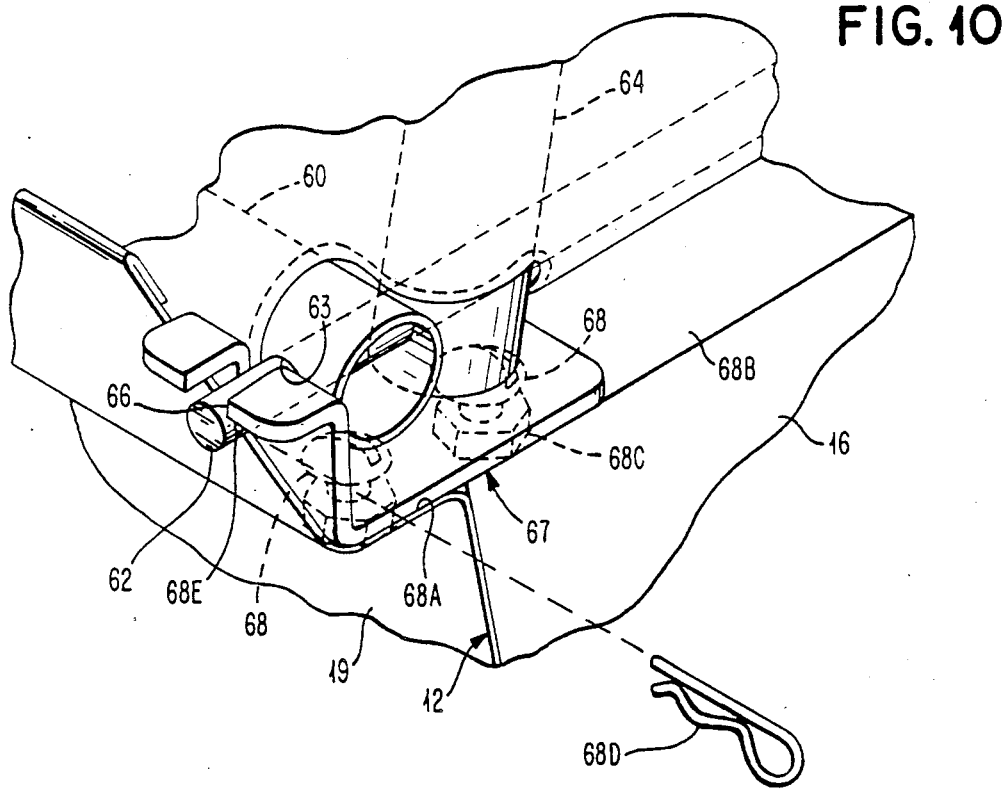
FIG. 10 is an enlarged fragmentary perspective view of the connection of a portion of the canopy frame to the body.

As shown in FIG. 10, one end of the rod 62 extends through a slot 66 in a mounting bracket 67, which is fixed to the body 12 by bolts 68 extending through a flange 68A of the side wall 19 of the body 12 and a flange 68B of the front wall 16 of the body 12 and being retained by nuts 68C. A cotter pin 68D passes through a passage 68E in the rod 62 to attach the rod 62 to the body 12 while preventing rotation of the rod 62. The other end of the rod 62 is similarly connected to the body 12. This includes a mounting bracket 68F (see FIG. 17).

Figure 3:
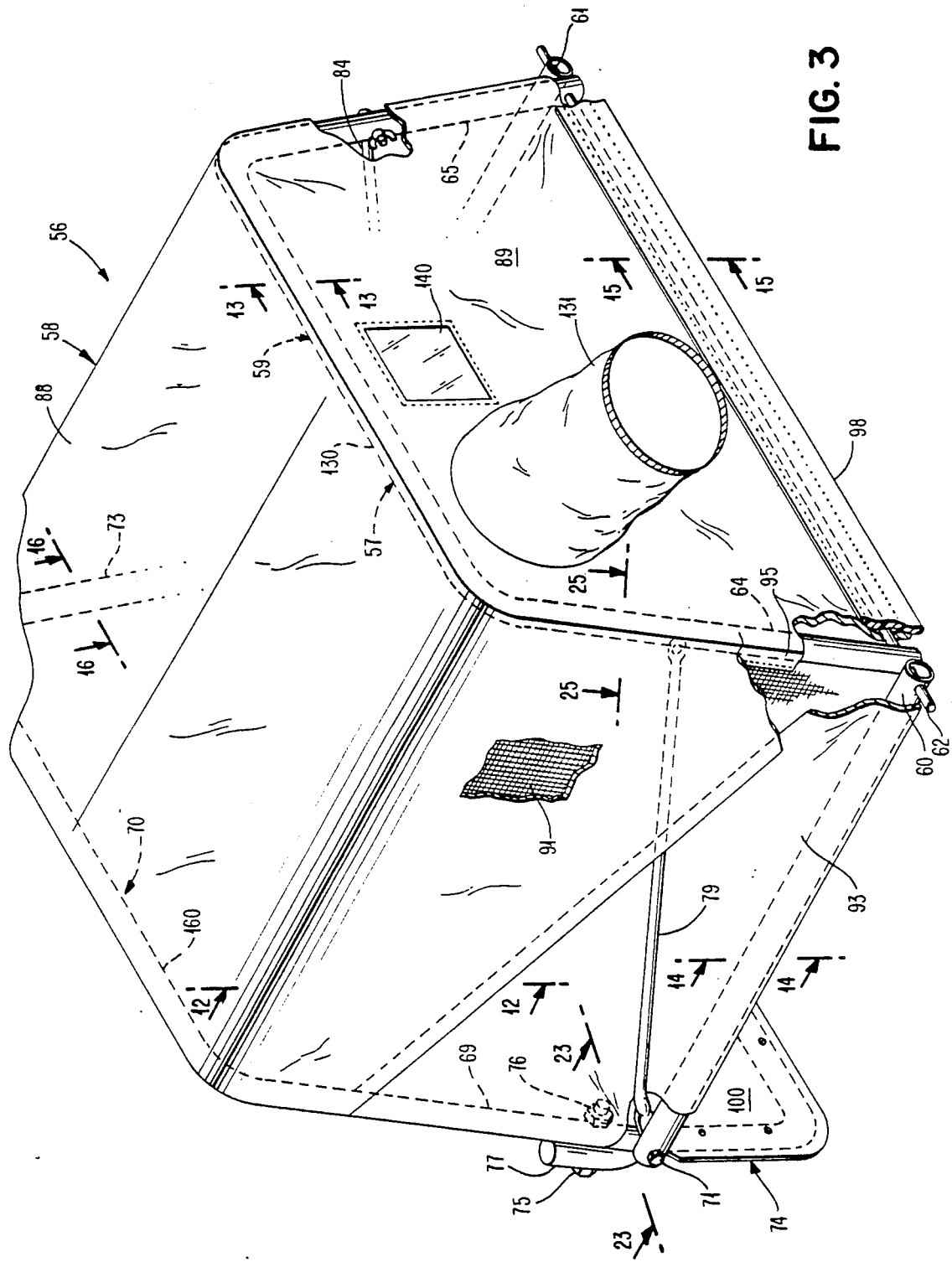
FIG. 3 is a perspective view, partly in section with parts broken away, of a canopy of the cart of FIG. 1.
Figure 4:
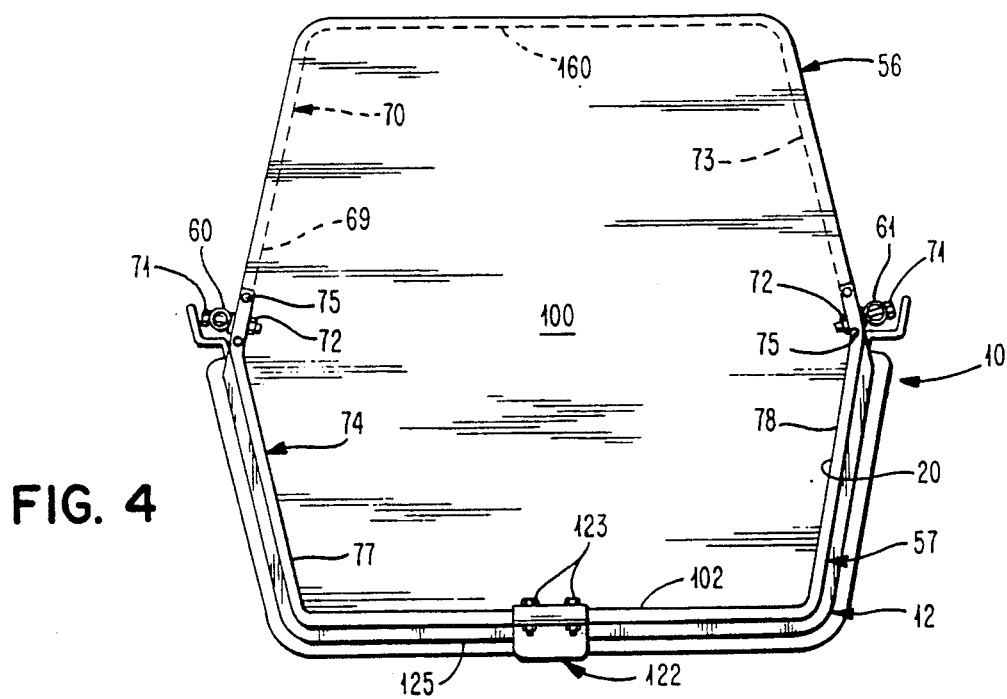
FIG. 4 is a rear elevational view of the body and the canopy of the cart of FIG. 1 in its towed position with other parts omitted for clarity purposes.

The rear end of the side tube 60 (see FIG. 3) has a substantially vertical leg 69 of a rear upper frame 70, which is U-shaped, pivotally connected thereto through a bolt 71 and a nut 72 (see FIG. 4). The side tube 61 is similarly connected to a substantially vertical leg 73 of the rear upper frame 70.

A rear bottom frame 74, which is U-shaped, is secured to the rear upper frame 70 by bolts 75 and nuts 76 (see FIG. 3) to form a rear frame support. The bolts 75 attach an overlying portion of a leg 77 (see FIG. 4) of the rear bottom frame 74 to the leg 69 of the rear upper frame 70 and an overlying portion of a leg 78 of the rear bottom frame 74 to the leg 73 of the rear upper frame 70.

Figure 23:
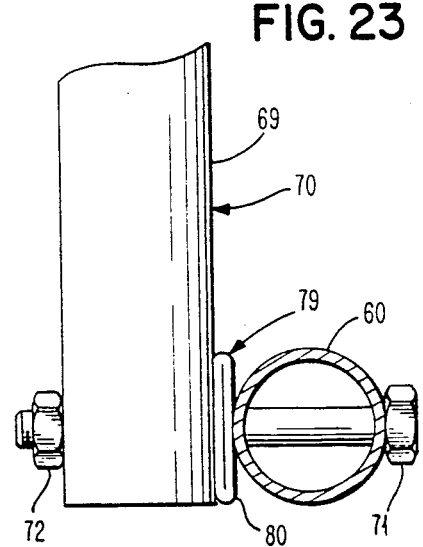
FIG. 23 is an enlarged fragmentary top plan view, partly in section, of a pivotal connection of a rear frame support to connecting supports of the canopy frame and taken along line 23—23 of FIG. 3.

A side support or strut 79 (see FIG. 3) extends diagonally from an intermediate portion of the leg 64 of the front upper frame 59 to the pivotal connection of the leg 69 of the rear upper frame 70 and the side tube 60. As shown in FIG. 23, the side support 79 has a flattened rear end 80 disposed between the side tube 60 and the leg 69 of the rear upper frame 70.

Figure 25:
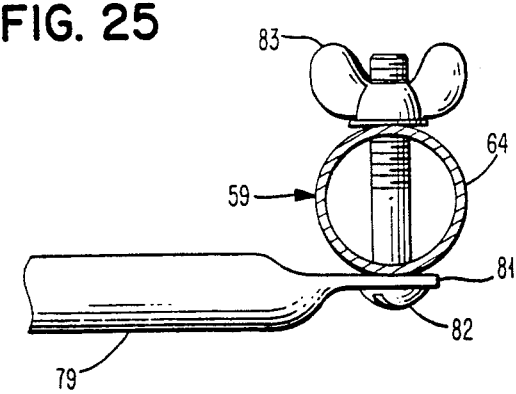
FIG. 25 is a fragmentary sectional view of the connection of a side support to a leg of a front upper frame of the canopy frame and taken along line 25—25 of FIG. 3.

The side support 79 has a flattened front end 81 (see FIG. 25) for cooperation with the leg 64 of the front upper frame 59 so that the side support 79 can be connected to the leg 64 of the front upper frame 59 by a bolt 82 and a wing nut 83. A side support or strut 84 (see FIG. 3), which is identical to the side support 79, extends in a similar manner between the leg 65 of the front upper frame 59 and the leg 73 of the rear upper frame 70. There also is a pivotal connection between the side support 84, the side tube 61, and the leg 73 of the rear upper frame 70 in the same manner as the side support 79 is pivotally connected to the leg 69 of the rear upper frame 70 and the side tube 60.

Figure 13:
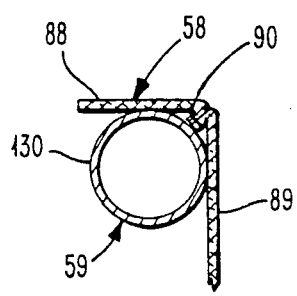
FIG. 13 is a fragmentary sectional view of a portion of the cover material of the canopy showing the connection between a main central portion and a front portion and taken along line 13—13 of FIG. 3.

The cover material 58 includes a main central portion 88 of a flexible woven material such as a woven polyester, for example. The main central portion 88 of the cover material 58 is attached to a front portion 89 (see FIG. 13) by seam stitches 90.

Figure 12:
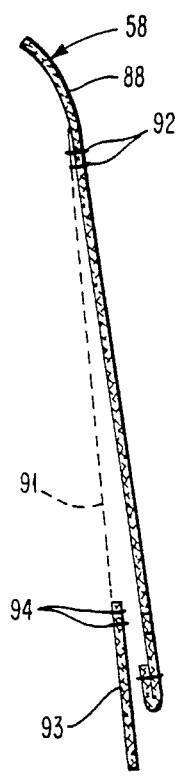
FIG. 12 is a fragmentary sectional view of a portion of the cover material of the canopy and taken along line 12—12 of FIG. 3.

Each side of the main central portion 88 (see FIG. 3) has a triangular shaped mesh piece 91 such as a woven polyester with an open weave, for example, attached to it by stitches 92 (see FIG. 12). The bottom end of each of the mesh pieces 91 on opposite sides of the main central portion 88 has a bottom portion 93 of the same material as the main central portion 88 secured thereto by stitches 94. Thus, each of the mesh pieces 91 has a lower part of the main central portion 88 overlying it to allow air to blow out from the interior of the canopy 56 (see FIG. 3). The vertical portion of each of the mesh pieces 91 is attached to a portion 95 of the front portion 89 of the cover material by stitching (not shown).

By forming the mesh pieces 91 of a substantially triangular shape, the air is blown away from the operator of the riding lawn mower 11 (see FIG. 1). Additionally, since the rear of the canopy 56 is filled initially because of the debris being supplied to its front, it is desired for the larger area of the triangular shaped mesh pieces 91 (see FIG. 3) to be adjacent the front of the canopy 56.

Figure 14:
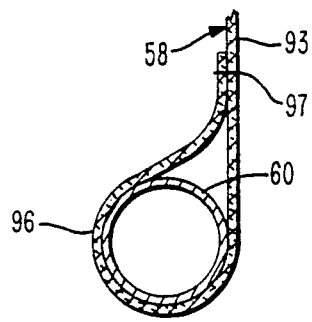
FIG. 14 is a fragmentary sectional view of a portion of the canopy showing the arrangement for connecting a side tube of the canopy frame to the cover material of the canopy and taken along line 14—14 of FIG. 3.

One of the bottom portions 93 of the cover material 58 has a looped portion 96 (see FIG. 14) extending around the side tube 60. Stitches 97 retain the looped portion 96 attached to the bottom portion 93 of the cover material 58. A similar arrangement exists for the side tube 61 (see FIG. 3) and the other of the bottom portions 93.

Figure 15:
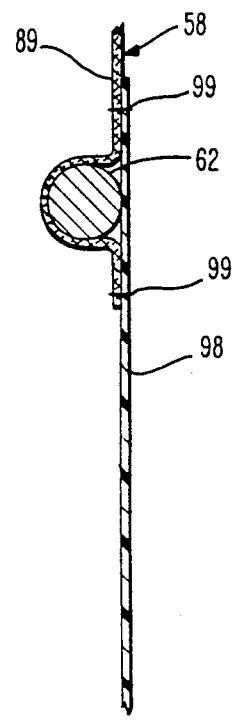
FIG. 15 is a fragmentary sectional view of a portion of the canopy cover showing the relation between the front portion of the cover material of the canopy and a front pivot rod of the canopy frame about which the canopy frame pivots and taken along line 15—15 of FIG. 3.

As shown in FIG. 15, the front portion 89 of the cover material 58 has its lower end looped around the inside portion of the rod 62. A piece 98 of a semi-rigid material such as polyethylene, for example, is attached by stitches 99 to the lower end of the front portion 89 of the cover material 58 to enclose the outer portion of the rod 62. The piece 98 of polyethylene extends downwardly within the interior of the front wall 16 (see FIG. 2) of the body 12. The piece 98 (see FIG. 3) of polyethylene is preferably about 0.040" thick. The piece 98 of polyethylene preferably has a total length of about four inches and a width of about forty-two inches. The piece 98 provides a seal at the front end of the cart 10 (see FIG. 1) by being disposed inside of the front wall 16 (see FIG. 2) of the cart 10.

The rear upper frame 70 (see FIG. 3) and the rear bottom frame 74, which cooperate to form the rear frame support, have an end closure 100 supported thereby to close the open rear end 20 (see FIG. 4) of the body 12 when the canopy 56 is in its closed position. The end closure 100 may be formed of any suitable semi-rigid material such as polyethylene, for example. When the end closure 100 is formed of polyethylene, the polyethylene preferably has a thickness of 0.040".

Figure 16:
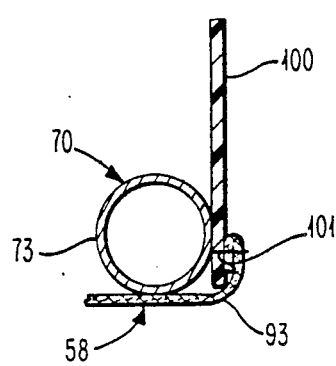
FIG. 16 is a fragmentary sectional view of a portion of the cover material of the canopy showing the connection of a rear end closure of the canopy and a portion of the cover material of the canopy and taken along line 16—16 of FIG. 3.

The end closure 100 is attached to the main central portion 88 (see FIG. 3) of the cover material 58 and the adjacent portion of the two bottom portions 93 of the cover material 58. As shown in FIG. 16, the end closure 100 is attached to the bottom portions 93 of the cover material 58 by stitches 101. The end closure 100 is similarly attached to the main central portion 88 (see FIG. 3) of the cover material 58 where the bottom portions 93 of the cover material 58 are not present.

The end closure 100 (see FIG. 4) also is attached to each of the legs 77 and 78 of the rear bottom frame 74 and to a horizontal tube 102 of the rear bottom frame 74 by metal cutting screws. Thus, the end closure 100 is rigidly positioned.

Figure 6:
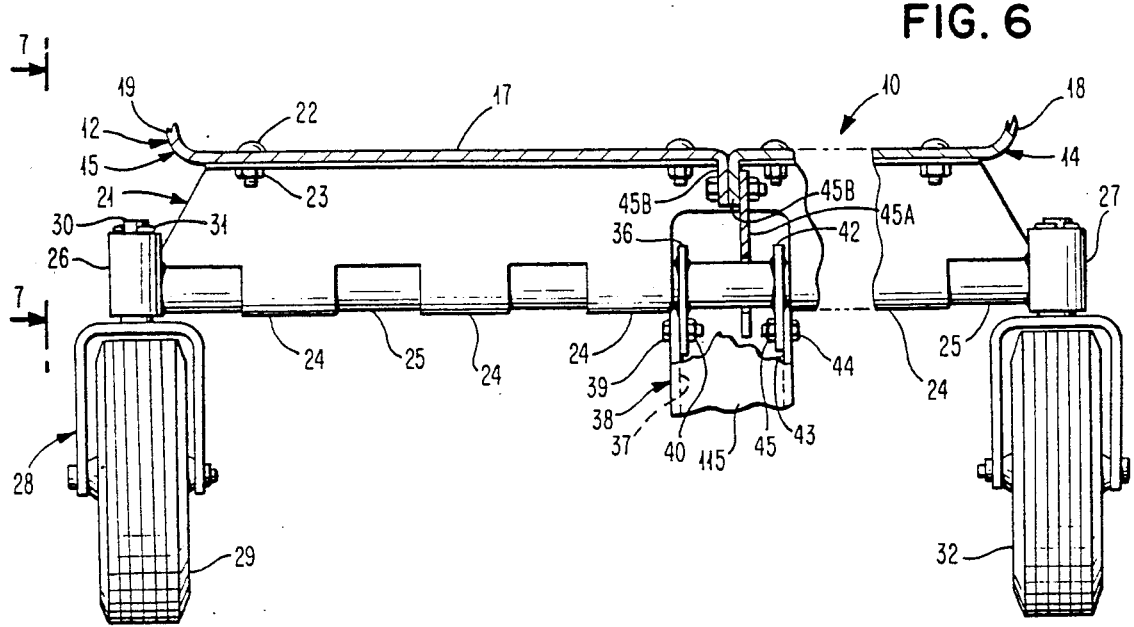
FIG. 6 is a front elevational view of a portion of the cart of FIG. 1 and showing the connection of the tow bar to the body of the cart through an axle support that also supports caster pivot tubes.
Figure 7:
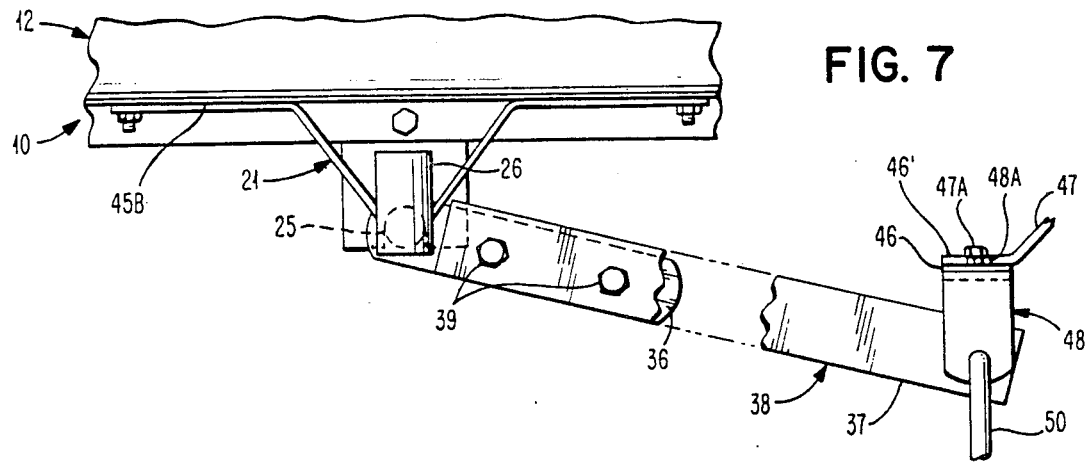
FIG. 7 is a fragmentary side elevational view of FIG. 6 and taken along line 7—7 of FIG. 6 but without caster wheels and showing the tow bar of the cart connected to the hitch bar of the riding lawn mower.

The body 12 (see FIG. 1) of the collector cart 10 is retained in its non-dumping or tow position through being locked to the tow bar 38 to prevent relative pivoting therebetween about the dump pivot bar 25 (see FIG. 6). The body 12 has a latch bracket 103 (see FIG. 17), which comprises two L-shaped brackets 104 (see FIG. 2) and 105 secured to the bottom wall 17 of the body 12 by bolts 106 and nuts 107. Each of the L-shaped brackets 104 and 105 also is attached to the bottom flanges 45B (see FIG. 17) of the body 12 by bolts 109 and nuts 110. A latch 111 is pivotally mounted on the latch bracket 103 by a bolt 112 and a nut 113.

The tow bar 38 (see FIG. 11) has a longitudinal slot 114 of triangular shape in its top wall 115 to receive a portion of the latch 111. The latch 111 has a slot 116 (see FIG. 18) to receive a portion of the top wall 115 (see FIG. 11) of the tow bar 38 when a portion of the latch 111 is disposed within the longitudinal slot 114 in the top wall 115 of the tow bar 38. A spring 117 (see FIG. 17), which is attached to the latch 111 and to the latch bracket 103, continuously urges the latch 111 counterclockwise (as viewed in FIG. 17) about the bolt 112 against an adjustable stop bolt 118, which extends through a vertical slot 119 in the L-shaped bracket 104 and a corresponding vertical slot (not shown) in the L-shaped bracket 105 (see FIG. 2) and is retained in position by a nut 120. This holds the end of the slot 116 (see FIG. 17) in the latch 111 to receive an edge of the top wall 115 of the tow bar 38 at the narrow end of the longitudinal slot 114 (see FIG. 11) to lock the body 12 (see FIG. 17) to the tow bar 38 so that the body 12 is maintained in its non-dumping or tow position. The adjustable stop bolt 118 controls the position of the latch 111 through adjustment in the vertical slot 119 in the L-shaped bracket 104 and the corresponding vertical slot (not shown) in the L-shaped bracket 105 (see FIG. 2).

When the body 12 is in its non-dumping or tow position, the canopy 56 (see FIG. 4) has its rear end locked to the rear end of the body 12. The rear bottom frame 74 of the frame 57 of the canopy 56 has a rear latch lock 122 secured to the bottom horizontal tube 102 of the rear bottom frame 74 by screws 123. The rear latch lock 122 (see FIG. 17) has a portion 124 extending below a bottom rear flange 125 of the body 12. Thus, the canopy 56 is locked to the body 12 at its rear end so that it cannot be raised by lifting on the rear of the canopy 56.

Figure 8:
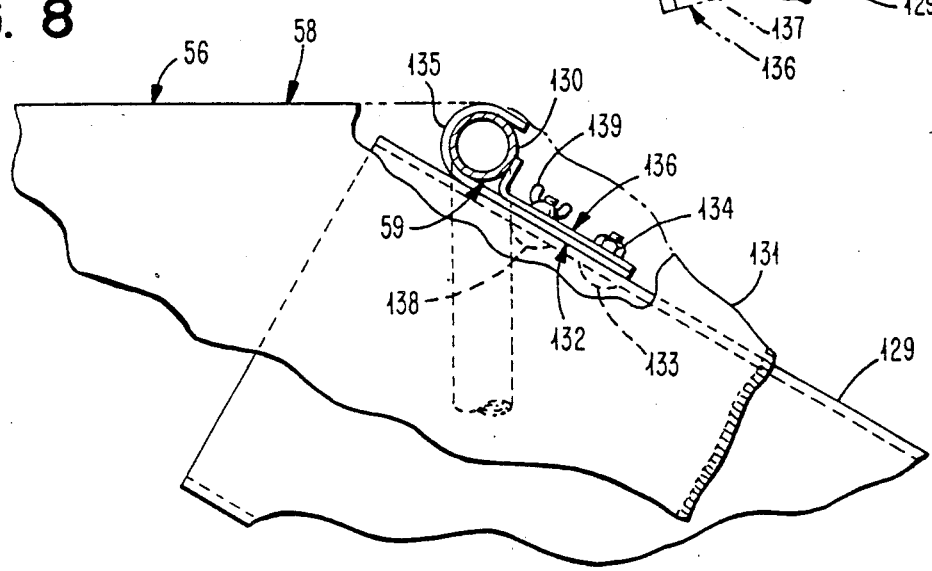
FIG. 8 is a fragmentary elevational view, partly in section, of a portion of the canopy frame and showing its connection to a chute transporting debris to the interior of the canopy.

With the canopy 56 resting on top of the body 12 and locked thereto by the rear latch lock 122, the debris picked up by the riding lawn mower 11 (see FIG. 1) is supplied from an outlet 126 in a deck 127 of the riding lawn mower 11 through a chute 128. The chute 128 has a telescoping arrangement with a second and larger chute 129, which has its upper end connected to an upper horizontal tube 130 (see FIG. 8) of the front upper frame 59.

The upper end of the second chute 129 extends into a sleeve 131 of the cover material 58 of the canopy 56 with the end of the sleeve 131 having elastic therearound to grip against the outer surface of the second chute 129. The second chute 129 has a strap tube connector 132 secured thereto by a bolt 133 and a nut 134. The strap tube connector 132 has an arcuate or curved end 135 fitting around the horizontal tube 130 of the front upper frame 59.

Figure 9:
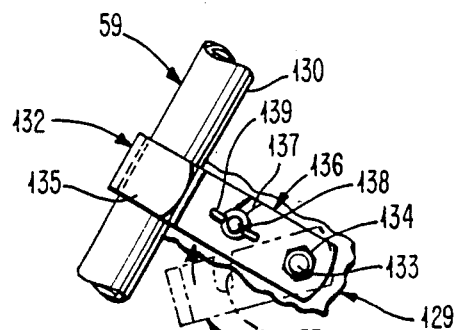
FIG. 9 is a fragmentary top plan view of a portion of FIG. 8 and showing the connection of the chute to the canopy frame.

An L-shaped clip tube lock 136 is pivotally mounted on the bolt 133 and moves between its phantom line position of FIG. 9 and its solid line position of FIG. 9 in which it cooperates with the arcuate or curved end 135 of the strap tube connector 132 to retain the second chute 129 connected to the horizontal tube 130 of the front upper frame 59. The clip tube lock 136 has a slot 137 to receive a bolt 138, which extends from the second chute 129 through the strap tube connector 132 and has a wing nut 139 cooperating therewith. Thus, when the clip tube lock 136 is moved to its chute retaining position (solid line position), the slot 137 receives the bolt 138 and the wing nut 139 is tightened to retain the clip tube lock 136 in its chute retaining position.

As shown in FIG. 3, the front portion 89 of the cover material 58 of the canopy 56 has an opening covered by a transparent material 140 such as Plexiglas, for example. This allows the interior of the canopy 56 to be viewed.

When the canopy 56 is in its closed position in which the rear latch lock 122 (see FIG. 17) has the portion 124 disposed beneath the bottom rear flange 125 of the body 12, a release handle 141 and a dump handle 142 are in the solid line position of FIG. 17. This is the non-dumping or tow position of the body 12 of the cart 10.

Figure 21:
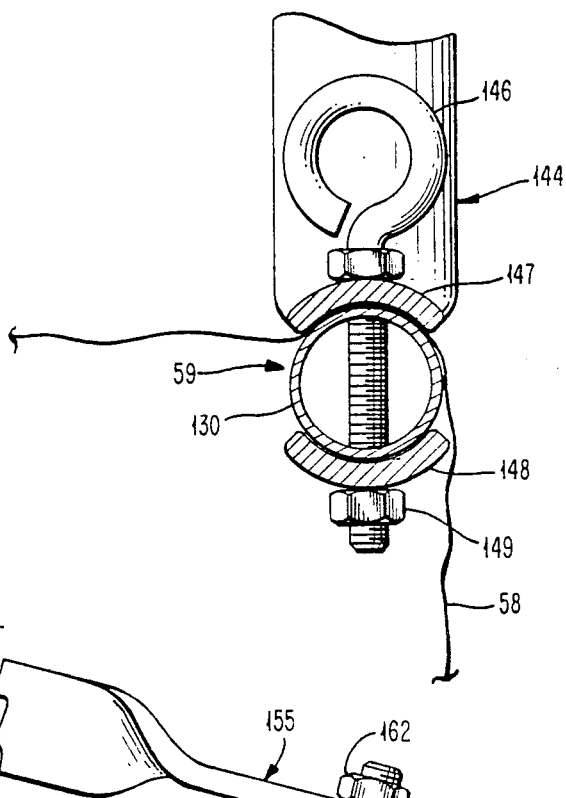
FIG. 21 is a fragmentary sectional view of a portion of the mounting arrangement of FIG. 19 and taken along line 21—21 of FIG. 20.
Figure 20:
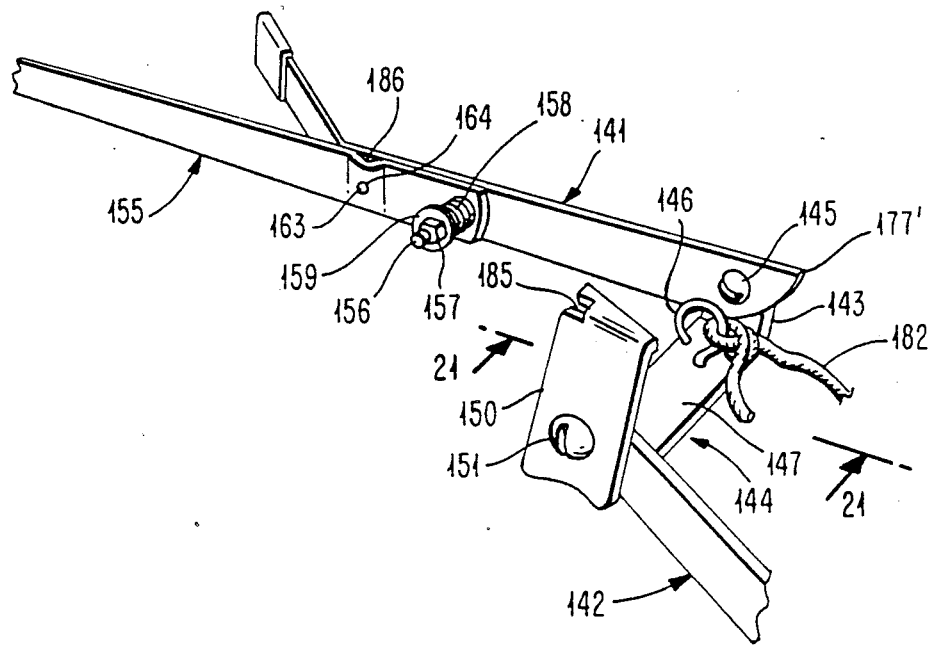
FIG. 20 is an enlarged fragmentary perspective view showing a mounting arrangement for mounting the two actuating mechanisms on the canopy frame.

The release handle 141 (see FIG. 20) has one end pivotally connected to an ear 143 of a bracket 144 by a bolt 145 and a nut 145' (see FIG. 17). The bracket 144 (see FIG. 20) is secured to the horizontal tube 130 (see FIG. 21) of the front upper frame 59 by suitable means such as an eye bolt 146 extending through its base 147, a portion of the cover material 58, the upper horizontal tube 130 of the front upper frame 59, a bracket support 148 beneath the upper horizontal tube 130, and a nut 149. A bolt (not shown) and a nut (not shown) also cooperate in the same manner as the eye bolt 146 and the nut 149 to secure the bracket 144 to the horizontal upper tube 130 of the front upper frame 59 adjacent an ear 150 (see FIG. 20) at the opposite end of the base 147 to the ear 143.

The dump handle 142 is pivotally mounted on the ear 150 of the bracket 144 by a bolt 151 (see FIG. 22) and a lock nut 152. A spring 153 surrounds the bolt 151 and has one end acting against the dump handle 142 and its other end acting against a flat washer 154 bearing against the lock nut 152.

Intermediate its ends, the release handle 141 (see FIG. 20) is pivotally connected to one end of a release link 155 by a bolt 156 and a lock nut 157. A spring 158 is disposed between the release link 155 and a flat washer 159 bearing against the lock nut 157 to continuously urge the release handle 141 towards the release link 155.

Figure 24:
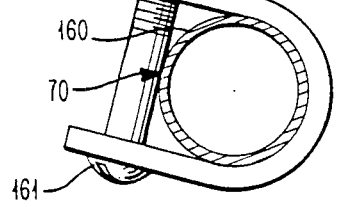
FIG. 24 is an enlarged fragmentary perspective view showing the connection of the first actuating mechanism to a rear frame of the canopy frame.

As shown in FIG. 24, the release link 155 has its other end, which is curved, pivotally mounted on a horizontal upper tube 160 of the rear upper frame 70. The release link 155 has its curved end retained on the horizontal upper tube 160 by a bolt 161 and a nut 162.

The release handle 141 (see FIG. 17) is maintained in the solid line position of FIG. 17 by a lock pin 163 (see FIG. 20) on the release handle 141 being retained within a hole 164 in the release link 155 by the force of the spring 158. Therefore, to remove the release handle 141 from the solid line position of FIG. 17, the release handle 141 (see FIG. 20) must be moved laterally against the force of the spring 158 so that the lock pin 163 on the release handle 141 can disengage from the hole 164 in the release link 155.

When the canopy 56 (see FIG. 17) is in its closed position (solid line position of FIG. 17), one end of the dump handle 142 rests against the base 147 (see FIG. 20) of the bracket 144. The dump handle 142 has a leverage arm 165 (see FIG. 22) pivotally connected thereto by a bolt 166 and a nut 167. The leverage arm 165 has a flange 168 on one end with the flange 168 having one of its edges bearing against the dump handle 142.

The other end of the leverage arm 165 has a plurality of holes 169 therein with a right angled upper end 170 of a rod 171 disposed therein. The right angled upper end 170 of the rod 171 is retained within one of the holes 169 in the leverage arm 165 by a washer 172 and a cotter pin 173. Thus, the rod 171 is pivotally connected to the leverage arm 165.

The rod 171 has its right angled lower end 174 (see FIG. 1) disposed within a hole 175 (see FIG. 17) in the latch 111 to pivotally connect the latch 111 and the rod 171. The right angled lower end 174 (see FIG. 1) of the rod 171 is similarly connected to the latch 111 as the right angled upper end 170 (see FIG. 22) is connected to the leverage arm 165.

When it is desired to dump the debris thrown into the collector cart 10 (see FIG. 1) from the riding mower 11 through the chutes 128 and 129, the operator drives the riding lawn mower 11 to the area in which the material in the collector cart 10 is to be dumped. This usually necessitates backing of the riding lawn mower 11. The caster wheels 29 (see FIG. 6) and 32 enable backing of the collector cart 10 without any jackknifing of the collector cart 10. This also eliminates the necessity for maneuvering the riding lawn mower 11 (see FIG. 1).

When the collector cart 10 is ready to have the material dumped therefrom, the operator remains on a seat 176 of the riding lawn mower 11 and pulls sideways on the release handle 141 (see FIG. 20) to overcome the force of the spring 158 and remove the lock pin 163 on the release handle 141 from the hole 164 in the release link 155. After the lock pin 163 is removed from the hole 164 in the release link 155, the release handle 141 is pulled upwardly to cause counterclockwise (as viewed in FIG. 17) pivoting of the release handle 141 about the bolt 145 (see FIG. 20).

This counterclockwise (as viewed in FIG. 17) pivoting of the release handle 141 causes the rear upper frame 70 (see FIG. 4) and the rear bottom frame 74 to pivot counterclockwise (as viewed in FIG. 17) about the bolts 71 (see FIG. 17). This removes the rear latch lock 122 from its solid line position to its phantom line position as shown by an arrow 177. The release handle 141 is pivoted to its phantom line position of FIG. 17 in which the release handle 141 is substantially vertical. The resistance of the cover material 58 of the canopy 56 along with the contact of tip 177' (see FIG. 20) of the release handle 141 with the base 147 of the bracket 144 prevents further movement of the release handle 141.

In the phantom line position of FIG. 17, the release handle 141 can be employed to shake the canopy 56 to aid in breaking loose any debris that has bulged against the cover material 58 of the canopy 56 and against the end closure 100 (see FIG. 4) during filling. This eliminates a resistance to the normal lifting forces to move the canopy 56 (see FIG. 17) away from the body 12.

During filling of the interior of the body 12 and the canopy 56, the up and down motion of the collector cart 10 during its travel across the ground tends to pack the debris. This debris is initially packed against the end closure 100 (see FIG. 4) and then against the sides of the cover material 58 (see FIG. 3) of the canopy 56.

The pivoting of the rear upper frame 70 (see FIG. 4) and the rear bottom frame 74 removes the end closure 100 away from the packed debris so that it is no longer tightly packed thereagainst. The shaking of the release handle 141 (see FIG. 17) releases the packed material against the sides of the cover material 58 of the canopy 56.

Figure 22:
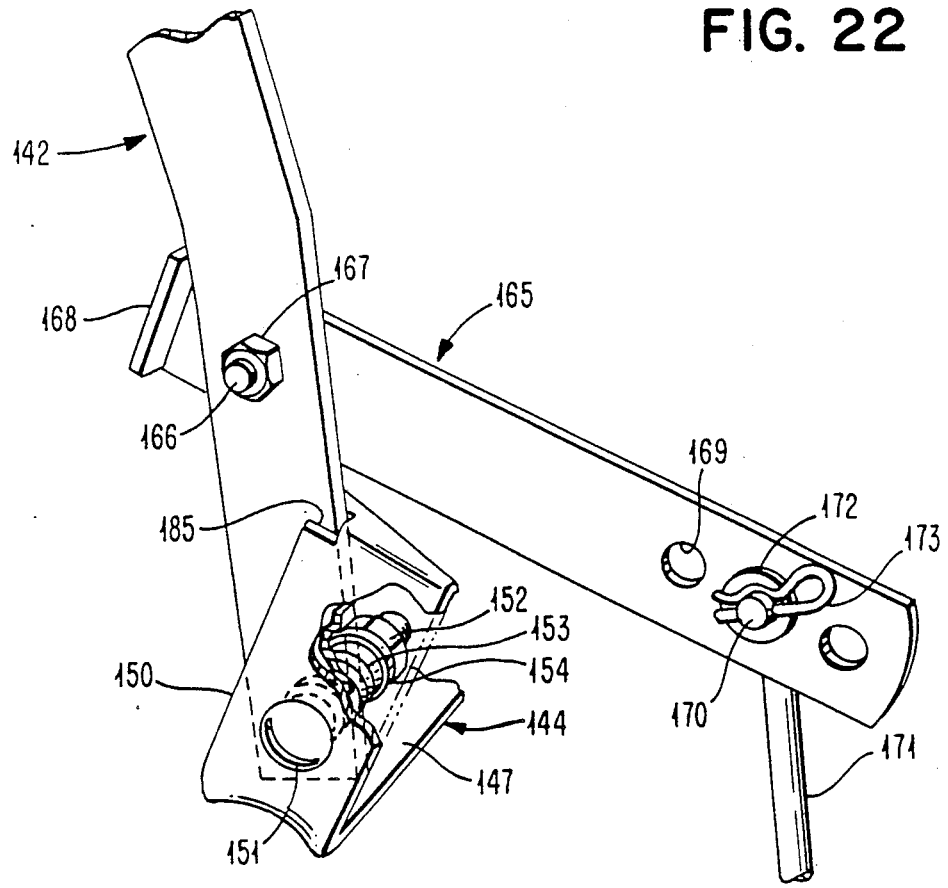
FIG. 22 is an enlarged fragmentary perspective view showing a dump handle of the second actuating mechanism being retained in its dumping position.

After the release handle 141 has been moved to its phantom line position of FIG. 17, the operator lifts upwardly on the dump handle 142 to pivot the dump handle 142 clockwise (as viewed in FIG. 18) about the bolt 151 (see FIG. 22). This initial pivoting of the dump handle 142 (see FIG. 18) lifts the rod 171 upwardly as indicated by an arrow 178 to pivot the latch 111 clockwise (as viewed in FIG. 18) about the bolt 112 and against the force of the spring 117.

The pivoting of the latch 111 is stopped by its engagement with a stop bolt 179, which extends through the L-shaped brackets 104 (see FIG. 2) and 105 of the latch bracket 103 and is retained in position by a nut 180. This pivoting of the latch 111 removes the slot 116 (see FIG. 19) in the portion of the latch 111 within the longitudinal slot 114 (see FIG. 11) in the top wall 115 of the tow bar 38 from receiving any portion of the top wall 115 of the tow bar 38 so that the latch 111 can be vertically withdrawn from the longitudinal slot 114 in the top wall 115 of the tow bar 38.

With the latch 111 (see FIG. 18) engaging the stop bolt 179 and the latch 111 no longer in locking engagement with the tow bar 38, continued lifting of the dump handle 142 causes the body 12 to pivot about the horizontal axis of the dump pivot bar 25 (see FIG. 6). This also causes the latch 111 (see FIG. 17) to have its portion within the longitudinal slot 114 (see FIG. 11) in the top wall 115 of the tow bar 38 to be withdrawn therefrom.

As the body 12 (see FIG. 18) begins to pivot clockwise (as viewed in FIG. 18 and indicated by an arrow 181), the canopy 56 is retrained from following this pivotal motion. This is because a rope 182 of a fixed length has one end attached to a portion 182' (see FIG. 1) of the riding mower 11 by a spring hook 183 such as used for connecting a dog leash to a dog collar. It should be understood that the one end of the rope 182 may be secured to other portions of the riding lawn mower 11. The other end of the rope 182 is attached to the eye bolt 146 (see FIG. 20) on the base 147 of the bracket 144.

Therefore, as the front end of the body 12 (see FIG. 1) pivots upwardly to its phantom line position of FIG. 1, the rope 182 causes the canopy 56 to begin to pivot about the axis of the rod 62. Thus, there is a clam shell relation between the body 12 and the canopy 56 as shown in phantom in FIG. 1. When the body 12 reaches its dumping position, the canopy 56 is completely raised therefrom as shown in phantom in FIG. 19.

The exact length of the rope 182 can be adjusted to increase or decrease the dump angle of the body 12. Thus, the dump angle of the body 12 increases as the length of the rope 182 increases and decreases as the length of the rope 182 shortens. The increased length of the rope 182 delays when the rope 182 becomes taut so that this permits additional motion of the body 12. Furthermore, the position where the rope 182 becomes taut has an effect on the amount of lifting effort on the dump handle 142. After the rope 182 becomes taut, continued lifting of the dump handle 142 to its solid line position of FIG. 19 causes rotation of the canopy 56 counterclockwise (as viewed in FIG. 19 and indicated by an arrow 184) while the body 12 continues to pivot clockwise (as viewed in FIG. 19).

Figure 18:
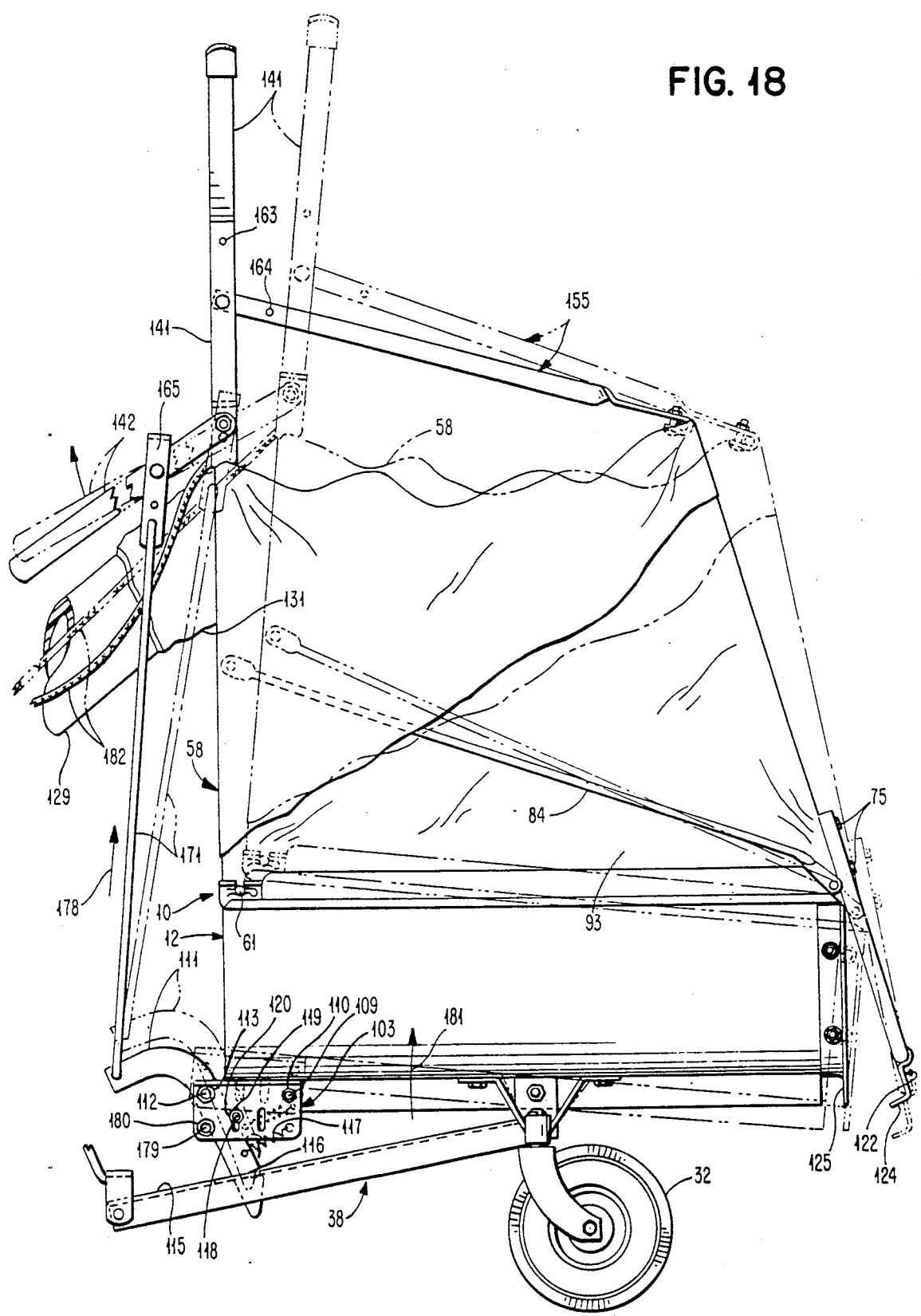
FIG. 18 is a fragmentary left side elevational view, similar to FIG. 17, of a portion of the cart of FIG. 1 and showing initial motion of a second of the actuating mechanisms to release a latch from the tow bar in solid line position and the cart body starting to pivot in phantom line position.
Figure 19:
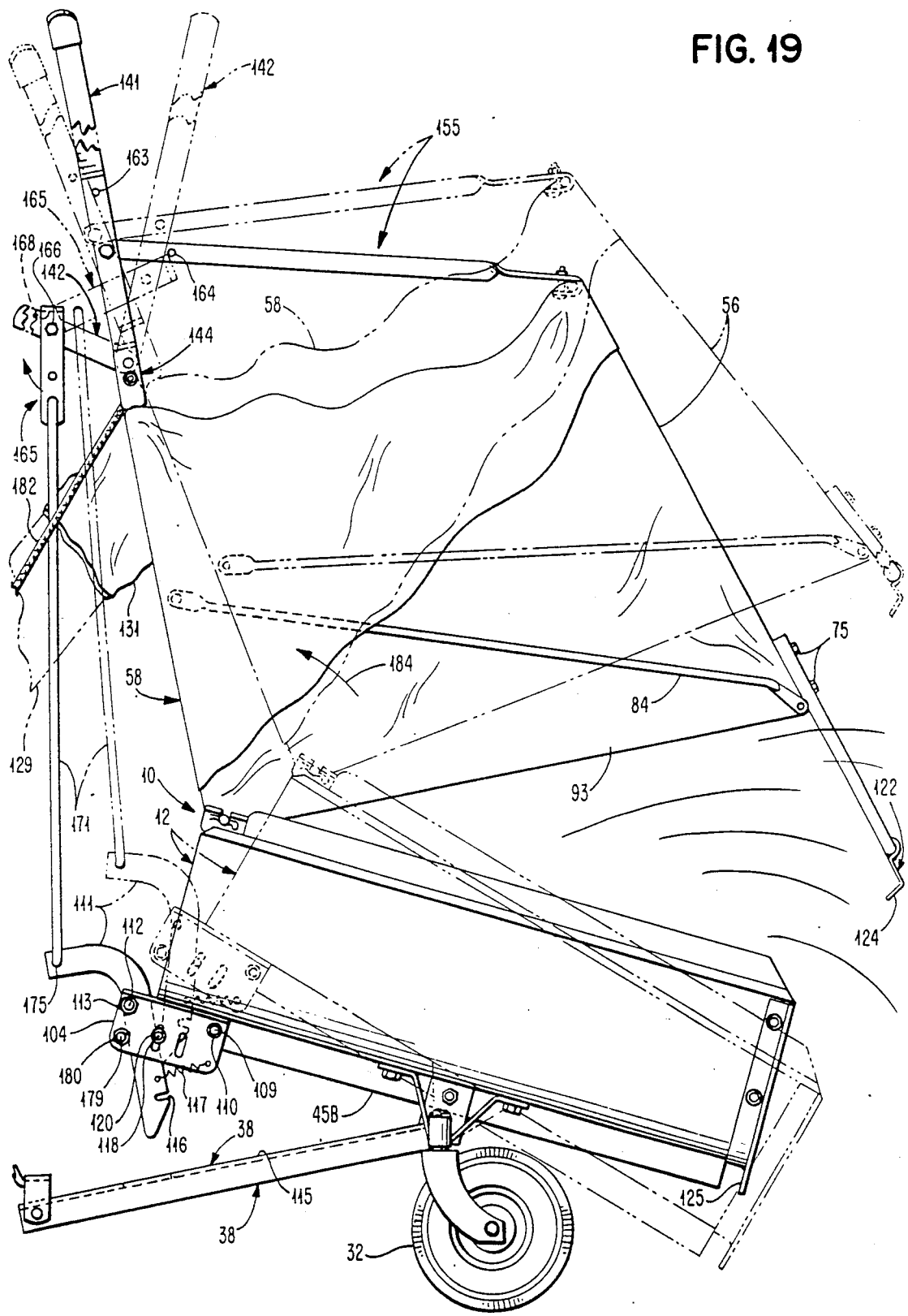
FIG. 19 is a fragmentary left side elevational view, similar to FIGS. 17 and 18, of a portion of the cart of FIG. 1 and showing the cart body pivoted to the position in which the canopy begins to pivot in solid line position and the cart body and canopy in their dumping positions in phantom line position.

During raising of the dump handle 142 from its phantom line position of FIG. 18 to its solid line position of FIG. 19, the leverage arm 165 pivots about the bolt 166 (see FIG. 22) until the flange 168 of the leverage arm 165 has its opposite edge engage the dump handle 142, as shown in the solid line position of FIG. 19, to stop pivoting of the leverage arm 165. This provides an increase in the total length between the contact of the leverage arm 165 with the dump handle 142 and the pivotal connection of the rod 171 with the latch 111.

Further pivoting of the dump handle 142 to slightly beyond vertical as shown in phantom in FIG. 19 results in the body 12 reaching its dumping position. This position of the dump handle 142 shortens the distance between the pivotal connection of the dump handle 142 with the leverage arm 165 and the pivotal connection of the rod 171 with the latch 111. Shortening of this distance proportionally increases the opening between the canopy 56 and the open rear end 20 (see FIG. 4) in the body 12.

Accordingly, the angle of the bottom wall 17 (see FIG. 2) of the body 12 and the relation of the canopy 56 (see FIG. 19) to the body 12 is such that all debris collected within the collector cart 10 is dumped therefrom. The open rear end 20 (see FIG. 4) in the body 12 allows all debris within the body 12 to fall therefrom. As shown in phantom in FIG. 19, the angle of the canopy 56 is such that any material remaining therein will fall by gravity into the body 12.

When the dump handle 142 reaches its phantom line position of FIG. 19, its release by the operator results in the spring 153 (see FIG. 22) urging the dump handle 142 to the position of FIG. 22 in which the dump handle 142 is held within a retaining slot 185 in the ear 150 of the bracket 144. This insures that the body 12 remains in its phantom line position of FIG. 19 when the dump handle 142 (see FIG. 19) is released. Accordingly, this avoids the operator having to hold the dump handle 142 throughout the dumping of the debris from the collector cart 10.

When dumping of the debris from the collector cart 10 has been completed, the dump handle 142 is removed from the latch slot 185 (see FIG. 22) in the ear 150 of the bracket 144 and is pushed downwardly by the operator of the riding mower 11 (see FIG. 1) until the latch 111 is again locked to the tow bar 38 as shown in the solid line position in FIG. 17. Then, the release handle 141 is moved clockwise (as viewed in FIG. 17) until the release handle 141 (see FIG. 20) is locked to the release link 155. No lateral force is required on the release handle 141 during its downward motion as a dimpled edge 186 on the release link 155 guides the lock pin 163 on the release handle 141 into the hole 164 in the release link 155.

When the front upper frame 59 (see FIG. 3) is pivoted to its collapsed position and the rear upper frame 70 and the rear bottom frame 74 are similarly pivoted to their collapsed position, the front upper frame 59 will not engage the rear upper frame 70 or the rear bottom frame 74. By removing the connection of the second chute 129 (see FIG. 8) to the upper horizontal tube 130 of the front upper frame 59 by releasing the wing nut 139 and rotating the clip tube lock 136 and then disconnecting the rod 62 (see FIG. 10) from the mounting brackets 67 and 68F (see FIG. 17) secured to the body 12, the canopy 56 (see FIG. 1) can be removed from its mounting on the body 12 and stored in its collapsed condition, which requires a very small volume for storage.

It should be understood that the collector cart 10 may be employed as a utility cart. This is accomplished by removing the canopy 56 and installing a tailgate (not shown) such as shown in the aforesaid Doering patent to close the open rear end 20 (see FIG. 4) of the body 12.

Referring to FIG. 26, there is shown another embodiment of the present invention including a collector cart 190 for collecting thrown debris such as grass clippings and leaves, for example, from the riding lawn mower 11, for example, which tows or pulls the collector cart 190 behind it. The collector cart 190 includes the body 12 (see FIG. 1) of the collector cart 10 except that the body 12 (see FIG. 26) of the collector cart 190 does not have the latch bracket 103 (see FIG. 1) of the body 12 of the collector cart 10 attached thereto.

The body 12 (see FIG. 26) of the collector cart 190 is pivotally supported by the dump pivot bar 25 in the same manner as previously described for the collector cart 10 (see FIG. 1) and has the caster wheels 29 and 32 (see FIG. 6) supporting it in the same manner as described for the body 12 of the collector cart 10.

A U-shaped tow bar 191 (see FIG. 26), which is similar to the U-shaped tow bar 38 (see FIG. 6), is attached to the dump pivot bar 25 in the same manner as described for the tow bar 38 so that the tow bar 191 (see FIG. 26) and the caster wheels 29 and 32 are integral with each other. The tow bar 191 has its forward end attached to the hitch plate 46 of the riding lawn mower 11.

As shown in FIG. 29, the tow bar 191 has a hollow tube 193 welded to its side walls 194 and 195 and extending therefrom to receive a pin 196, which extends through an opening 197 in a plate 198 welded to a square shaped tube 199. The square shaped tube 199 is supported by two spaced U-shaped bolts 200 (one shown in FIG. 29), which are attached to the hitch plate 46 by nuts 201.

The two spaced U-shaped bolts 200 enable transverse adjustment of the collector cart 190 (see FIG. 26) relative to the riding lawn mower 11 in accordance with the width of the riding lawn mower 11. The transverse adjustment is made by sliding the square shaped tube 199 (see FIG. 29) relative to the hitch plate 46 after releasing the nuts 201.

After the pin 196 extends through the opening 197 in the plate 198, the pin 196 extends through the hollow tube 193 and an opening 202 in a second plate 203, which is welded to the square shaped tube 199. A cotter pin 204 retains the pin 196 in position so as to connect the tow bar 191 to the hitch plate 46 whereby the collector cart 190 (see FIG. 26) can be towed or pulled by the riding lawn mower 11. Thus, the tow bar 191 constitutes pull connecting means.

The connection between the tow bar 191 (see FIG. 29) and the hitch plate 46 allows relative movement therebetween about the horizontal axis of the pin 196 extending through the hollow tube 193 for the unevenness of the ground. The slight spacing of the ends of the hollow tube 193 from the plates 198 and 203 enables a very limited pivoting about a vertical axis between the tow bar 191 and the hitch plate 46.

The collector cart 190 (see FIG. 26) also includes a canopy 206, which is similar to the canopy 56 (see FIG. 3), mounted solely for pivotal movement with respect to the body 12 (see FIG. 26) and enclosing the open top of the body 12 and closing the open rear end 20 (see FIG. 4) of the body 12 to form an enclosed chamber therebetween. The canopy 206 (see FIG. 26) includes a frame 207 and the collapsible cover material 58 supported by the frame 207.

The frame 207 is the same as the frame 57 (see FIG. 3) except that the rear upper frame 70 of the frame 57 is replaced by a rear upper frame 209 (see FIG. 26), which is U-shaped and pivotally connected at its lower ends to the side tubes 60 (see FIG. 3) and 61 by the bolts 71 in the same manner as the rear upper frame 70 of the frame 57. However, the rear upper frame 209 (see FIG. 26) has each of its legs 210 and 211 (see FIG. 39) formed with a lower upstanding portion 212 (see FIG. 26) and an upper portion 214 angled forwardly from the lower portion 212.

In the same manner as the frame 57 (see FIG. 3), the rear upper frame 209 (see FIG. 26) of the frame 207 of the canopy 206 and the rear bottom frame 74, which cooperate to form the rear frame support, have the end closure 100 (see FIG. 4) supported thereby to close the open rear end 20 of the body 12 when the canopy 206 (see FIG. 26) is in its closed position.

The body 12 of the collector cart 190 has a pair of support brackets 216 (see FIG. 32) attached to the bottom flanges 45B on the body 12 by a bolt 217 and a nut 217' and to the bottom wall 17 of the body 12 by bolts 218 and nuts 218'. The support brackets 216 have one end of a support bar 219 (see FIG. 31) pivotally connected thereto by a bolt 220 and a nut 221 (see FIG. 32). The support bar 219 includes a first portion 222 (see FIG. 31) and a second portion 223 inclined at an angle to the first portion 222.

The first portion 222 of the support bar 219 has a pair of rollers 224 rotatably supported thereby at its end adjacent its junction with the second portion 223. The second portion 223 has a roller 225 rotatably supported between a pair of brackets 225' (see FIG. 33) at its end.

A dump handle 226 includes a first lower portion 227 (see FIG. 26) and a second upper portion 228, which is at an angle to the lower portion 227. The lower portion 227 of the dump handle 226 has its bottom end welded to the first portion 222 of the support bar 219.

When the body 12 of the collector cart 190 is in its non-dumping or tow position, each of the rollers 224 (see FIG. 33) is disposed beneath a tab 229 of a triangular shaped plate 230. The plates 230 are secured to the side walls 194 and 195 of the tow bar 191 by bolts 231 and nuts 232 (see FIG. 41).

The body 12 (see FIG. 34) of the collector cart 190 has a handle retaining bracket 233 supported on the flange 68B by bolts 234 and nuts (not shown). The handle retaining bracket 233 has a retaining slot 236 to hold or retain the lower portion 227 of the dump handle 226 in its inactive position in which the body 12 of the collector cart 190 is retained in its non-dumping or tow position of FIG. 26. This retaining position of the dump handle 226 disposes the rollers 224 (see FIG. 33) beneath the tabs 229 to prevent pivoting of the body 12 relative to the tow bar 191 about the dump pivot bar 25 (see FIG. 26).

Each of the support brackets 216 (see FIG. 32) has a bottom flange 237 on its lower end resting against a projection 237' extending upwardly from a top wall 238 of the tow bar 191 when the body 12 is in its non-dumping or tow position. Therefore, the body 12 of the collector cart 190 is releasably locked or connected to the tow bar 191 to retain the body 12 of the collector cart 190 in its non-dumping or tow position as shown in FIG. 26.

When the body 12 of the collector cart 190 is in its non-dumping or tow position, the canopy 206 has its rear end locked to the rear end of the body 12 by the rear latch lock 122 in the same manner as the canopy 56 (see FIG. 1) of the collector cart 10 is locked to the rear end of the body 12 of the collector cart 10. Thus, the canopy 206 (see FIG. 26) is locked to the body 12 of the collector cart 190 at its rear end so that it cannot be raised by lifting on the rear of the canopy 206.

With the canopy 206 resting on top of the body 12 and locked thereto by the rear latch lock 122, the debris picked up by the riding lawn mower 11 is supplied to the interior of the canopy 206 through the telescoping chutes 128 and 129 in the same manner as described with respect to the collector cart 10 of FIG. 1. The second and larger chute 129 (see FIG. 35) is connected to the upper horizontal tube 130 of the front upper frame 59 of the frame 207 in a manner slightly different than the second chute 129 is connected to the upper horizontal tube 130 (see FIG. 8) of the front upper frame 59 of the frame 57 (see FIG. 3) of the canopy 56. Instead of using the L-shaped clip tube lock 136 (see FIG. 8), a flat spring 239 (see FIG. 35) is attached to the second chute 129 and cooperates with an extension 240 of the curved end 135 of the strap tube connector 132.

Thus, connection of the upper end of the second chute 129 to the frame 207 of the canopy 206 is accomplished by depressing the flat spring 239 against the strap tube connector 132 until after the arcuate curved end 135 of the strap tube 132 has passed around the upper horizontal tube 130 of the front upper frame 59 of the frame 207 of the canopy 206. Then, the flat spring 239 is released to the position in FIG. 35.

When the canopy 206 (see FIG. 26) is in its closed position in which the rear latch lock 122 has the portion 124 disposed beneath the bottom rear flange 125 of the body 12, a release handle 241 and the dump handle 226 are in the position of FIG. 26. This is the non-dumping or tow position of the body 12 of the collector cart 120.

The release handle 241 (see FIG. 36) is pivotally connected to an ear 242 of a bracket 243 by a bolt 244 extending through a square shaped hole 245 (see FIG. 37) in the ear 242 and a square shaped hole 246 (see FIG. 36) in the release handle 241 and a nut 247. The bracket 243 is secured to the horizontal tube 130 (see FIG. 37) of the front upper frame 59 of the frame 207 (see FIG. 26) of the canopy 206 by suitable means such as bolts 249 (see FIG. 37) and nuts (not shown).

Intermediate its ends, the release handle 241 (see FIG. 36) is pivotally connected to one end of a release link 250 by a bolt 251 passing through an elongated slot 251' in the release handle 241 and a lock nut 252. A spring 253 is disposed between a flat washer 254 bearing against the release link 250 and a flat washer 255 bearing against the lock nut 252 to continuously urge the release handle 241 towards the release link 250. A jam nut 256 is disposed between a flat washer 257 bearing against the release handle 241 and a flat washer 258 bearing against the release link 250 to prevent shifting of the release handle 241 relative to the bolt 251 after the release handle 241 has been adjusted at the desired position relative to the bolt 251.

As shown in FIGS. 38 and 39, the release link 250 has its other end pivotally mounted on a pivot pin 259, which is supported in an upstanding ear 260 of a bracket 261. A cotter pin 262 retains the release link 250 on the pivot pin 259. The bracket 261 is mounted on a horizontal upper tube 263 (see FIG. 39) of the rear upper frame 209 by suitable means such as a carriage bolt 264 extending through its curved base 265, a portion of the cover material 58, the horizontal upper tube 263 of the rear upper frame 209, a curved bracket support 266, a washer 267, and a nut 268.

The release handle 241 (see FIG. 26) is maintained in the position of FIG. 26 by a lock pin 269 (see FIG. 36)

on the release handle 241 being retained within an elongated slot 270 in the release link 250 by the force of the spring 253. Therefore, to remove the release handle 241 from the position of FIG. 26, the release handle 241 (see FIG. 36) must be moved laterally against the force of the spring 253 so that the lock pin 269 on the release handle 241 can disengage from the elongated slot 270 in the release link 250. A Bellville spring 270' is disposed between the ear 242 and the release handle 241 to apply friction to the release handle 241 to allow the limited lateral movement of the release handle 241 to disengage the lock pin 269 from the elongated slot 270 in the release link 250.

One of the bolts 249 (see FIG. 37) also secures a clip 271 to the bracket 243. The clip 271 has an elongated slot 272 to receive one end of a rod 273, which has its other end wrapped around the pin 196 (see FIG. 30) and retained thereon by a washer 274 and a cotter pin 275.

The end of the rod 273 passing through the elongated slot 272 (see FIG. 37) in the clip 271 has a spring 276 slidably supported thereon between washers 277 and 278. A cotter pin 279 retains the spring 276 and the washers 277 and 278 on the rod 273.

The rod 273 also aids in preventing pivoting of the body 12 (see FIG. 26) relative to the tow bar 191 as long as the canopy 206 is locked to the cart 12. However, as soon as the rear latch lock 122 is rendered ineffective by the release handle 241 causing pivoting of the canopy 206 to its solid line position of FIG. 27, the rod 273 no longer aids in preventing pivoting of the body 12 relative to the tow bar 191.

When it is desired to dump the debris thrown into the collector cart 190 from the riding mower 11 (see FIG. 26) through the chutes 128 and 129, the operator drives the riding lawn mower 11 to the area in which the material in the collector cart 190 is to be dumped. This usually necessitates backing of the riding lawn mower 11. The caster wheels 29 and 32 enable backing of the collector cart 190 without any jacknifing of the collector cart 190. This also eliminates the necessity for maneuvering the riding lawn mower 11.

When the collector cart 190 is ready to have the material dumped therefrom, the operator remains on the seat 176 of the riding lawn mower 11 and pulls sideways on the release handle 241 (see FIG. 36) to overcome the force of the spring 253 and remove the lock pin 269 on the release handle 241 from the elongated slot 270 in the release link 250. After the lock pin 269 is removed from the elongated slot 270 in the release link 250, the release handle 241 is pulled downwardly to cause clockwise (as viewed in FIG. 26) pivoting of the release handle 241 about the bolt 244 (see FIG. 36).

This clockwise (as viewed in FIG. 26) pivoting of the release handle 241 causes the rear upper frame 209 and the rear bottom frame 74 to pivot clockwise about the bolts 71. This removes the rear latch lock 122 from its locking position of FIG. 26 to its release position (solid line position in FIG. 27) as shown by an arrow 280 in FIG. 27. The release handle 241 is stopped in its pivoting about the bolt 244 (see FIG. 36) by engagement with a base 281 of the bracket 243. The operator then pulls forwardly on the release handle 241 as indicated by an arrow 282 in FIG. 27. This causes the canopy 206 to pivot about the rod 62 from its solid line position to its phantom line position of FIG. 27.

In this position, the release handle 241 can be employed to shake the canopy 206 to aid in breaking loose any debris that has bulged against the cover material 58 of the canopy 206 and against the end closure 100 (see FIG. 4) during filling. This eliminates a resistance to the normal lifting forces to move the canopy 206 (see FIG. 27) away from the body 12.

During filling of the interior of the body 12 and the canopy 206, the up and down motion of the collector cart 190 during its travel across the ground tends to pack the debris. This debris is initially packed against the end closure 100 (see FIG. 4) and then against the sides of the cover material 58 (see FIG. 27) of the canopy 206.

The bulging-locking effect of the material when the canopy 206 is heavily loaded is reduced by having each of the legs 210 (see FIG. 26) and 211 (see FIG. 39) of the rear upper frame 209 with the upper portion 214 angled relative to the lower portion 212 (see FIG. 26). This slightly reduces the area towards the top of the canopy 206 to enable the debris to fall easier therefrom.

After the release handle 241 has been moved to its phantom line position of FIG. 27, the operator disengages the dump handle 226 from the retaining slot 236 (see FIG. 34) in the handle retaining bracket 233 by moving the dump handle 226 rearwardly and then pulling the dump handle 226 sideways through an enlarged slot 283 in the handle retaining bracket 233. After the dump handle 226 has cleared the handle retaining bracket 233, the dump handle 226 is pulled forwardly towards its solid line position of FIG. 28.

The initial forward movement of the dump handle 226 causes the rollers 224 to engage the top wall 238 of the tow bar 193 if they are not already in engagement therewith. As the dump handle 226 is continued to be pulled forwardly in the direction of an arrow 284 in FIG. 28, the body 12 of the collector cart 190 begins to pivot counterclockwise about the dump pivot bar 25 with the rollers 224 riding along the top wall 238 of the tow bar 191. The rollers 224 provide a maximum leverage and minimum handle effort for initially pivoting the body 12.

As the dump handle 226 is continued to be pulled forwardly, the roller 225 engages the top wall 238 of the tow bar 191 as shown in the solid line position of FIG. 28. After the rollers 224 and 225 are engaging the top wall 238 of the tow bar 191, continued forward movement of the dump handle 226 causes the rollers 224 to move rearwardly past the tabs 229 (see FIG. 33) on the plates 230 so that continued counterclockwise (as viewed in FIG. 28) pivoting of the body 12 raises the rollers 224 from engagement with the top wall 238 of the tow bar 191 before the rollers 224 engage the projection 237'.

As the body 12 begins to pivot counterclockwise from its solid line position of FIG. 28, the canopy 206 is restrained from following this motion because the rod 273 is of a fixed length. As the rod 273 restrains the canopy 206, the spring 276 (see FIG. 37) absorbs the shock created by the force exerted on the clip 271 by the rod 273.

Therefore, as the front end of the body 12 (see FIG. 28) pivots upwardly to its phantom line position, the rod 273 causes the canopy 206 to pivot about the axis of the rod 62. Thus, there is a clam shell relation between the body 12 and the canopy 206 as shown in phantom in FIG. 28. When the body 12 reaches its dump position, the canopy 206 is completely raised therefrom as shown in phantom in FIG. 28.

When the dump handle 226 reaches its phantom line position of FIG. 28 from its solid line position of FIG. 28, the roller 225 will have passed beyond the tabs 229 (see FIG. 33) on the plates 230. When the roller 225 reaches its phantom line position of FIG. 28, the roller 225 has passed over the projection 237' extending upwardly from the top wall 238 of the tow bar 191. This insures that the body 12 remains in its phantom line position of FIG. 28 when the dump handle 226 is released. Accordingly, this avoids the operator having to hold the dump handle 226 throughout dumping of debris from the collector cart 190.

As the dump handle 226 is advanced forwardly from its solid line position of FIG. 28 to its phantom line position of FIG. 28, the body 12 will move automatically to its phantom line position of FIG. 28 if it is heavily loaded. If the body 12 is not heavily loaded, then more effort for moving the dump handle 226 forwardly in the direction of the arrow 284 is needed.

When dumping of debris from the collector cart 190 has been completed, the dump handle 226 is pushed rearwardly by the operator of the riding lawn mower 11 (see FIG. 26). This causes the roller 225 (see FIG. 28) to move over the projection 237' and then for the dump handle 226 to be returned to its retaining position within the slot 236 (see FIG. 34) in the handle retaining bracket 233. To prevent any injury to the hand of the operator during this rearward movement of the dump handle 226, the handle retaining bracket 233 has a rubber bumper block 286 on its front surface 287.

Then, the release handle 241 is moved counterclockwise (as viewed in FIG. 27) until the release handle 241 is locked to the release link 250. No lateral force is required on the release handle 241 during its counterclockwise motion as a dimpled edge 288 (see FIG. 36) on the release link 250 guides the lock pin 269 on the release handle 241 into the elongated slot 270 in the release link 250.

It should be understood that the support bar 219 (see FIG. 31) could have additional rollers between the rollers 224 and 225 if desired. Furthermore, the rollers 224 and 225 and the support bar 219 on which the rollers 224 and 225 are mounted could be replaced by a plate 289 (see FIG. 40), which is welded to the bottom end of the lower portion 227 of the dump handle 226. The triangular shaped plates 230 (see FIG. 31) would be replaced by a pair of triangular shaped plates 290 with each of the triangular shaped plates 290 having a tab 291 (see FIG. 41).

The plate 289 (see FIG. 40), which is pivotally supported on the support brackets 216 by the bolt 220 and the nut 221 (see FIG. 32), has a bottom curved surface 292 (see FIG. 40) functioning as a cam surface instead of the rollers 224 (see FIG. 31) and 225. The bottom curved surface 292 (see FIG. 40) of the plate 289 rides along a strip 293, which has a thickness preferably between ⅛" and 3/16", of a relatively low coefficient of friction material such as a high density polyethylene, for example. The strip 293 is fixed to the top wall 238 of the tow bar 191 by rivets 294 (see FIG. 41). If desired, the bottom curved surface 292 (see FIG. 40) of the plate 289 could have the strip 293 of a relatively low coefficient of friction rather than the top wall 238 of the tow bar 191. The strip 293 of a relatively low coefficient of friction reduces drag due to the bottom curved surface 292 of the plate 289 being in continuous engagement with the strip 293.

When the body 12 of the collector cart 190 (see FIG. 26) is in its non-dumping or tow position in which the dump handle 226 is retained by the handle retaining bracket 233, a pin 295 (see FIG. 41), which extends through the plate 289, is disposed beneath the tab 291 on each of the plates 290 and engaging therewith. This prevents pivoting of the body 12 (see FIG. 40) relative to the tow bar 191 about the dump pivot bar 25 (see FIG. 26).

When the body 12 is in its phantom line position of FIG. 28, the plate 289 (see FIG. 40) engages the projection 237' in the same manner as the roller 225 (see FIG. 28). If desired, the projection 237' may be omitted and the strip 293 (see FIG. 40) extended to the position of the projection 237' to hold the body 12 in its phantom line position of FIG. 28 when the dump handle 226 is released.

The operation of the embodiment of FIGS. 40 and 41 is the same as described when using the rollers 224 (see FIG. 31) and 225 except that there is continuous engagement of the bottom curved surface 292 (see FIG. 40) of the plate 289 with the strip 293 on the top wall 238 of the tow bar 191.

When the front upper frame 59 (see FIG. 26) of the canopy 206 is pivoted to its collapsed position and the rear upper frame 209 and the rear bottom frame 74 are similarly pivoted to their collapsed position, the front upper frame 59 will not engage the rear upper frame 209 or the rear bottom frame 74. By removing the connection of the second chute 129 (see FIG. 35) to the upper horizontal tube 130 of the front upper frame 59 of the frame 207 through depressing the flat spring 239 and then disconnecting the rod 62 (see FIG. 10) from the mounting brackets 67 and 68F (see FIG. 17) secured to opposite sides of the body 12 (see FIG. 26) of the collector cart 190, the canopy 206 can be removed from its mounting on the body 12 and stored in its collapsed position, which requires a very small volume for storage.

It should be understood that the collector cart 190 may be employed as a utility cart. This is accomplished by removing the canopy 206 and installing a tailgate (not shown) such as shown in the aforesaid Doering patent to close the open rear end 20 (see FIG. 4) of the body 12.

When the collector cart 190 (see FIG. 26) is utilized as a utility cart, it also is necessary to remove the rod 273. With the canopy 206 and the rod 273 removed, the body 12 is held against pivoting by the dump handle 226 being held by the handle retaining bracket 233.

An advantage of this invention is that an operator of a riding lawn mower does not have to get off of it to dump the contents of a collector cart being towed or pulled by the riding lawn mower. Another advantage of this invention is that there is automatic unlocking of the canopy of the collector cart from the body of the collector cart when dumping is to occur. A further advantage of this invention is that all of the debris within the collector cart is removed without any requirement for manual removal. Still another advantage of this invention is that it is easy to back up the collector cart to a dumping area. A still further advangage of this invention is that the canopy may be easily removed therefrom. Yet another advangage of this invention is that the canopy of the collector cart may be collapsed to a very small volume for storage.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

We claim:

1. A collector cart for towing by pulling means including:
   a body having a bottom wall, side walls, a front wall, and an open rear end;
   wheel means;
   body mounting means for mounting said body for pivotal movement relative to said wheel means and for support thereby;
   a canopy including: a frame; and a cover mounted on said frame;
   frame pivotal mounting means for mounting said frame on top of said body solely for pivotal movement of said canopy between a closed position and a dumping position, said frame pivotal mounting means being disposed adjacent the front of each of said frame and said body;
   said frame including closing means for closing said open rear end of said body when said canopy is in its closed position when mounted on top of said body;
   said cover of said canopy having receiving means for receiving debris into its interior and the interior of said body when said canopy is in its closed position when mounted on top of said body in which an enclosed chamber is formed between said canopy and said body except for said receiving means;
   locking means for locking said frame to said body to retain said canopy in its closed position;
   first mechanical actuating means for causing release of said locking means to unlock said frame from said body;
   second mechanical actuating means for causing pivoting of said body relative to said wheel means after said first mechanical actuating means has been effective to release said locking means, said second mechanical actuating means being separate from said first mechanical actuating means;
   body pivot preventing means for preventing pivoting of said body relative to said wheel means until said second mechanical actuating means is to be effective;
   causing means cooperating with said frame for causing pivoting of said frame about said frame pivotal mounting means relative to said body in response to pivoting of said body relative to said wheel means by said second mechanical actuating means;
   each of said first mechanical actuating means and said second mechanical actuating means being accessible from the front of said collector cart and being movable separately;
   said frame including:
     a rear frame support supporting said closing means and said locking means;
     and rear frame support pivotal mounting means for pivotally mounting said rear frame support;
   said locking means locking said rear frame support to said body to lock said frame to said body;
   and said first mechanical actuating means including attached means attached to said rear frame support for causing pivoting of said rear frame support relative to said rear frame support pivotal mounting means to release said locking means to unlock said frame from said body.

2. The collector cart according to claim 1 in which:
   said frame includes a front frame support pivotal mounted on said body by said frame pivotal mounting means;
   and said first mechanical actuating means includes means connected to said front frame support and to said attached means for pivoting said rear frame support about said rear frame support pivotal mounting means of said frame to release said locking means to unlock said frame from said body.

3. A collector cart for towing by pulling means including:
   a body having a bottom wall, side walls, a front wall, and an open rear end;
   wheel means;
   body mounting means for mounting said body for pivotal movement relative to said wheel means and for support thereby;
   a canopy including:
     a frame;
     and a cover mounted on said frame;
   frame pivotal mounting means for mounting said frame on top of said body solely for pivotal movement of said canopy between a closed position and a dumping position, said frame pivotal mounting means being disposed adjacent the front of each of said frame and said body;
   said frame including closing means for closing said open rear end of said body when said canopy is in its closed position when mounted on top of said body;
   said cover of said canopy having receiving means for receiving debris into its interior and the interior of said body when said canopy is in its closed position when mounted on top of said body in which an enclosed chamber is formed between said canopy and said body except for said receiving means;
   locking means for locking said frame to said body to retain said canopy in its closed position;
   first mechanical actuating means for causing release of said locking means to unlock said frame from said body;
   second mechanical actuating means for causing pivoting of said body relative to said wheel means after said first mechanical actuating means has been effective to release said locking means, said second mechanical actuating means being separate from said first mechanical actuating means;
   body pivot preventing means for preventing pivoting of said body relative to said wheel means until said second mechanical actuating means is to be effective;
   causing means cooperating with said frame for causing pivoting of said frame about said frame pivotal mounting means relative to said body in response to pivoting of said body relative to said wheel means by said second mechanical actuating means;
   each of said first mechanical actuating means and said second mechanical actuating means being accessible from the front of said collector cart and being movable separately;
   said frame including:
     a first frame pivotally mounted on said body by said frame pivotal mounting means;
     and a second frame pivotally supported by said first frame for pivotal movement of said second frame relative to said first frame during movement of said canopy between its closed position and its dumping position, said second frame including said closing means;

said locking means locking said second frame to said body to lock said frame to said body;

and said first mechanical actuating means including means for causing pivoting of said second frame to release said locking means to unlock said frame from said body.

4. A collector cart for towing by pulling means including:

a body having a bottom wall, side walls, a front wall, and an open rear end;

wheel means;

body mounting means for mounting said body for pivotal movement relative to said wheel means and for support thereby;

a canopy including:
 a frame;
 and a cover mounted on said frame;

frame pivotal mounting means for mounting said frame on top of said body solely for pivotal movement of said canopy between a closed position and a dumping position, said frame pivotal mounting means being disposed adjacent the front of each of said frame and said body;

closing means for closing said open rear end of said body when said canopy is in its closed position when mounted on top of said body;

said cover of said canopy having receiving means for receiving debris into its interior and the interior of said body when said canopy is in its closed position when mounted on top of said body in which an enclosed chamber is formed between said canopy and said body except for said receiving means;

locking means for locking said frame to said body to retain said canopy in its closed position;

first mechanical actuating means for causing release of said locking means to unlock said frame from said body;

second mechanical actuating means for causing pivoting of said body relative to said wheel means after said first mechanical actuating means has been effective to release said locking means, said second mechanical actuating means being separate from said first mechanical actuating means;

body pivot preventing means for preventing pivoting of said body relative to said wheel means until said second mechanical actuating means is to be effective;

said frame including means for pivotally mounting said closing means thereon for pivotal movement relative to said frame when said first mechanical actuating means is activated;

causing means cooperating with said frame for causing pivoting of said frame relative to said body in response to pivoting of said body relative to said wheel means by said second mechanical actuating means;

each of said first mechanical actuating means and said second mechanical actuating means being accessible from the front of said collector cart and being movable separately;

and said first mechanical actuating means including means pivotally supported by said frame for causing pivoting of said closing means relative to said frame to release said locking means to unlock said frame from said body.

5. The collector cart according to claim 3 including:

pull connecting means connected to said body mounting means and extending forwardly of said body for connection to the pulling means;

said body pivot preventing means including releasably engaging means for releasably engaging said body to said pull connecting means to prevent pivoting of said body relative to said wheel means;

and actuation of said second mechanical actuating means causing said releasably engaging means to disengage said body from said pull connecting means to allow pivoting of said body relative to said wheel means.

6. The collector cart according to claim 2 including:

pull connecting means connected to said body mounting means and extending forwardly of said body for connection to the pulling means;

said body pivot preventing means including releasably engaging means for releasably engaging said body to said pull connecting means to prevent pivoting of said body relative to said wheel means;

and actuation of said second mechanical actuating means causing said releasably engaging means to disengage said body from said pull connecting means to allow pivoting of said body relative to said wheel means.

7. The collector cart according to claim 2 including:

said front frame support of said frame including a substantially U-shaped member having a substantially horizontal portion and substantially vertical legs extending from opposite ends of said substantially horizontal portion;

said frame pivotal mounting means including means for pivotally mounting each of said legs of said front frame support on said body;

said rear frame support of said frame including:
 a substantially horizontal upper portion;
 and legs extending from opposite ends of said substantially horizontal upper portion;

a first support extending from intermediate one of said legs of said front frame support to a corresponding one of said legs of said rear frame support;

a first side element extending from adjacent the bottom of said one leg of said front frame support to said one leg of said rear frame support;

a second support extending from intermediate the other of said legs of said front frame support to the other of said legs of said rear frame support;

a second side element extending from adjacent the bottom of said other leg of said front frame support to said other leg of said rear frame support;

each of said first and second side elements being substantially parallel to each other and substantially perpendicular to said legs of said front frame support;

first means for pivotally connecting one of said legs of said rear frame support, said first support, and said first side element to each other;

and second means for pivotally connecting the other of said legs of said rear frame support, said second support, and said second side element to each other.

8. A collector cart for towing by pulling means including:

a body having a bottom wall, side walls, a front wall, and an open rear end;
wheel means;
body mounting means for mounting said body for pivotal movement relative to said wheel means and for support thereby;
a canopy including:
 a frame;
 and a cover mounted on said frame;
frame pivotal mounting means for mounting said frame on top of said body solely for pivotal movement of said canopy between a closed position and a dumping position, said frame pivotal mounting means being disposed adjacent the front of each of said frame and said body;
said frame including closing means for closing said open rear end of said body when said canopy is in its closed position when mounted on top of said body;
said cover of said canopy having receiving means for receiving debris into its interior and the interior of said body when said canopy is in its closed position when mounted on top of said body in which an enclosed chamber is formed between said canopy and said body except for said receiving means;
locking means for locking said frame to said body to retain said canopy in its closed position;
first pivotally mounted means for causing release of said locking means to unlock said frame from said body;
second pivotally mounted means for causing pivoting of said body relative to said wheel means after said first pivotally mounted means has been effective to release said locking means, said second pivotally mounted means being separate from said first pivotally mounted means;
body pivot preventing means for preventing pivoting of said body relative to said wheel means until said second pivotally mounted means is to be effective;
causing means for causing pivoting of said frame relative to said body in response to pivoting of said body relative to said wheel means by said second pivotally mounted means;
each of said first pivotally mounted means and said second pivotally mounted means being accessible from the front of said collector cart, each of said first pivotally mounted means and said second pivotally mounted means being movable separately;
said frame including:
 a rear frame support supporting said closing means and said locking means;
 and rear frame support pivotal mounting means for pivotally mounting said rear frame support;
said locking means locking said rear frame support to said body to lock said frame to said body;
and said first pivotally mounted means including attached means attached to said rear frame support for causing pivoting of said rear frame support relative to said rear frame support pivotal mounting means to release said locking means to unlock said frame from said body.

9. The collector cart according to claim 8 in which:
said frame includes a front frame support pivotally mounted on said body by said frame pivotal mounting means;
and said first pivotally mounted means includes means connected to said front frame support and to said attached means for pivoting said rear frame support about said rear frame support pivotal mounting means of said frame to release said locking means to unlock said frame from said body.

* * * * *